US008805199B2

(12) United States Patent  
Tajima et al.

(10) Patent No.: US 8,805,199 B2  
(45) Date of Patent: Aug. 12, 2014

(54) DISPERSION COMPENSATION DESIGN METHOD AND DISPERSION COMPENSATION DESIGN SYSTEM

(75) Inventors: Kazuyuki Tajima, Kawasaki (JP); Tomohiro Hashiguchi, Kawasaki (JP); Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 182 days.

(21) Appl. No.: 13/301,149

(22) Filed: Nov. 21, 2011

(65) Prior Publication Data

US 2012/0141137 A1    Jun. 7, 2012

(30) Foreign Application Priority Data

Dec. 3, 2010    (JP) .................................. 2010-270636

(51) Int. Cl.
*H04B 10/12*    (2006.01)
*H04B 10/2525*    (2013.01)

(52) U.S. Cl.
CPC ................. *H04B 10/25253* (2013.01)
USPC ............. 398/147; 398/158; 398/159; 398/29; 398/25; 398/28

(58) Field of Classification Search
None
See application file for complete search history.

(56) References Cited

U.S. PATENT DOCUMENTS

| 2005/0220136 | A1 | 10/2005 | Shinomiya et al. |
| 2006/0023641 | A1 | 2/2006 | Nakashima et al. |
| 2010/0098434 | A1 * | 4/2010 | Katagiri et al. ............... 398/159 |
| 2010/0215377 | A1 * | 8/2010 | Tajima et al. ................. 398/147 |

FOREIGN PATENT DOCUMENTS

| JP | 2006-42279 | 2/2006 |
| JP | 2010-98559 | 4/2010 |
| WO | WO 2004/088921 A1 | 10/2004 |

OTHER PUBLICATIONS

Masatoshi Sakawa, "Optimization of discrete systems" Mori Publishing Co, Ltd., May 2000, 29pages (with one page Concise Explanation).

* cited by examiner

*Primary Examiner* — Ken Vanderpuye
*Assistant Examiner* — David Lambert
(74) *Attorney, Agent, or Firm* — Staas & Halsey LLP

(57) ABSTRACT

A dispersion compensation design system includes a changing unit setting a changed value for the amount of dispersion compensation for a span connecting nodes constituting an optical network; a path classification unit determining whether respective paths in the optical network are capable of transmission with the changed value and classifying one or more of the paths as second category paths based on the determination results; an updating unit updating the amount of dispersion compensation with the changed value if the number of the second category paths in the latest classification result is less than the number of the second category paths in the retained previous classification result; and a repeating unit that, if not all of the paths in the optical network are capable of transmission, prevents use of combinations of amounts of dispersion compensation applied to the spans in the second category paths in the latest classification result.

15 Claims, 21 Drawing Sheets

FIG.2

| COMPENSATION AMOUNT MENU |
|---|
| 100 ps/nm |
| 200 ps/nm |
| 300 ps/nm |
| 400 ps/nm |
| 500 ps/nm |

FIG.4

| NUMBER OF SPANS | UPPER LIMIT OF TOLERABLE RANGE | LOWER LIMIT OF TOLERABLE RANGE |
|---|---|---|
| 1 | 70 [ps/nm] | −30 [ps/nm] |
| 2 | 63 | −23 |
| 3 | 56 | −16 |
| 4 | 49 | −9 |
| 5 | 42 | −2 |
| 6 | 35 | 5 |

FIG.5

| END NODE | START NODE | | | | | |
|---|---|---|---|---|---|---|
| | N1 | N2 | N3 | N4 | N5 | N6 |
| N2 | 5 | | | | | |
| N3 | 10 | 5 | | | | |
| N4 | 15 | 10 | 5 | | | |
| N5 | 20 | 15 | 10 | 5 | | |
| N6 | −3 | −8 | −13 | −18 | −23 | |
| N7 | 32 | 27 | 22 | 17 | 12 | 35 |

DISPERSION COMPENSATION DESIGN METHOD AND DISPERSION COMPENSATION DESIGN SYSTEM

CROSS-REFERENCE TO RELATED APPLICATION

This application is based upon and claims the benefit of priority of Japanese Patent Application No. 2010-270636 filed on Dec. 3, 2010, the entire contents of which are incorporated herein by reference.

FIELD

The embodiments discussed herein are related to a dispersion compensation design method and a dispersion compensation design system.

BACKGROUND

With a drastic increase in network traffic, wavelength division multiplexing technologies that enable large volume data transmission have become widely used. Also, there is a demand to transmit optical signals over a long distance without converting them into electric signals along the transmission path. However, in general, the speed of light transmitted through an optical fiber varies depending on the wavelength of the light. Therefore, even when multiple lights are emitted at the same time from a transmitting end, the lights arrive at the same receiving end at different timings depending on their wavelengths. This phenomenon is called wavelength dispersion.

Generally, signals are modulated before transmission. A modulated optical signal naturally has various widths in frequency. In other words, a modulated optical signal is composed of lights with different wavelengths. Accordingly, the waveform of a received optical signal tends to be distorted due to the wavelength dispersion and if excessive distortion occurs, it becomes difficult to correctly receive information. To compensate for the wavelength dispersion and thereby prevent this problem, when an optical signal is received at each node, the optical signal is processed by a dispersion compensation module (DCM) having wavelength dispersion characteristics that are opposite to those of optical fibers constituting the transmission path. This configuration makes it possible to transmit an optical signal over a long distance without distorting the waveform of the optical signal.

However, since the amount of wavelength dispersion increases in proportion to the distance and different types of optical fibers have different characteristics, it is necessary to use different DCMs depending on distances and the types of optical fibers. Here, since an inexpensive DCM is typically composed of passive components such as optical fibers, one type of DCM generally has a fixed characteristic. Therefore, it is necessary to determine in advance the locations and the characteristics of DCMs to be provided on the network. Determining the locations and the characteristics of DCMs on the network is called dispersion compensation design.

Here, the amount of wavelength dispersion compensation provided by a DCM preferably matches the amount of wavelength dispersion caused by an optical fiber. However, since DCMs are typically composed of passive optical components such as dispersion compensation optical fibers to reduce power consumption, it is not practical from a cost standpoint to produce DCMs suitable for respective optical fibers. For this reason, a DCM is generally configured to provide various amounts of wavelength dispersion compensation that are represented by graduated (or discrete) values and can be selected from a menu. In this case, even if an amount of wavelength dispersion compensation closest to the amount of wavelength dispersion compensation necessary for an optical fiber is selected, the selected amount of wavelength dispersion compensation is insufficient or excessive (this is called a compensation error) for the optical fiber by about one half of the interval between the graduated values.

FIG. 1 illustrates exemplary dispersion compensation results, and FIG. 2 illustrates an exemplary compensation amount menu of a DCM where dispersion compensation amounts are provided at intervals (or steps) of 100 ps/nm. In FIG. 1, N1 through N6 indicate nodes, and lines connecting the adjacent nodes indicate optical fibers and are called spans in the descriptions below. Figures under each span indicate, from the top to the bottom, the amount of wavelength dispersion (hereafter called the amount of dispersion) of the corresponding optical fiber, the amount of dispersion compensation, and the amount of dispersion after compensation. "Excessive compensation" in the bracket indicates that the amount of dispersion compensation is greater than the amount of dispersion of the optical fiber, and "insufficient compensation" in the bracket indicates that the amount of dispersion compensation is less than the amount of dispersion of the optical fiber. For example, the amount of dispersion of the optical fiber between the nodes N1 and N2 is 253 ps/nm and the closest amount of dispersion compensation in the menu of FIG. 2 is 300 ps/nm. In this case, the amount of dispersion compensation is excessive by 47 ps/nm.

Thus, with the compensation amount menu of FIG. 2 where the amounts of dispersion compensation are provided at the intervals of 100 ps/nm, a compensation error of ±50 ps/nm may occur. In a network of recent years where optical fibers are connected to each other like a mesh, optical fibers for which the amount of dispersion compensation is insufficient and optical fibers for which the amount of dispersion compensation is excessive tend to be distributed nearly at random.

FIG. 3 illustrates an exemplary network including seven nodes. The network of FIG. 3 includes nodes N1 through N7. A first figure below each span between the adjacent nodes indicates the amount of dispersion of the corresponding optical fiber and a second figure below the first figure indicates the amount of dispersion compensation.

FIG. 4 is a table illustrating exemplary tolerable ranges of cumulative dispersion. The tolerable range varies depending on the distance. In FIG. 4, the distance is represented by the number of spans that have substantially the same length. FIG. 5 is a table illustrating cumulative dispersion from a start node to an end node. When the node N1 is the start node and the node N2 is the end node, the cumulative dispersion of the path N1-N2 is 5 ps/nm that is obtained by subtracting the amount of dispersion compensation from the amount of dispersion of the optical fiber corresponding to the span N1-N2. In this case, the number of spans in the path N1-N2 is one. According to FIG. 4, when the number of spans is one, the tolerable range of cumulative dispersion is between 70 ps/nm and −30 ps/nm. Accordingly, 5 ps/nm is within the tolerable range and the path N1-N2 is capable of transmission (i.e., a signal or information can be transmitted correctly through the path N1-N2). When the node N1 is the start node and the node N7 is the end node, the path N1-N7 includes six spans (N1-N2, N2-N3, N3-N4, N4-N5, N5-N6, and N6-N7). Also in this case, since the cumulative dispersion of the path N1-N7 is 32 ps/nm and the tolerable range is between 35 ps/nm and 5 ps/nm, the path N1-N7 is capable of transmission.

Meanwhile, in the case of a path N1-N6 including five spans, the cumulative dispersion is −3 ps/nm and the tolerable range is between 42 ps/nm and −2 ps/nm. Therefore, the path N1-N6 is not capable of transmission. In this example, although signal transmission is not possible through the path N1-N6, signal transmission is possible through the path N1-N7 that is longer than the path N1-N6.

FIG. 6 is a flowchart illustrating a related-art dispersion compensation design process. As illustrated in FIG. 6, an arrangement of DCMs is generated in step S1 and whether all paths are capable of transmission is determined in step S2. If all the paths are capable of transmission, the process is completed. Meanwhile, if one (or more) of the paths is not capable of transmission (hereafter, a path not capable of transmission is called "incapable" path), in step S3, a regenerative repeater(s) is added in the middle of the incapable path.

FIG. 7 is a flowchart illustrating another related-art dispersion compensation design process. As illustrated in FIG. 7, an arrangement of DCMs is generated in step S5 and whether all paths are capable of transmission is determined in step S6. If all the paths are capable of transmission, the process is completed. Meanwhile, if one (or more) of the paths is not capable of transmission, a constraint that prevents use of the combination of the amounts of dispersion compensation currently applied to the incapable path is added and step S5 is repeated.

Japanese Laid-Open Patent Publication No. 2010-098559, for example, discloses a technology for securing the quality of optical paths. In the disclosed technology, a remaining wavelength dispersion target value (RDT) is determined for a first wavelength path having higher priority and a remaining wavelength dispersion tolerable range (RDR) is determined for a second wavelength path with lower priority, and the amounts of compensation of DCMs are determined such that the difference between the RDT and the remaining wavelength dispersion value of the first wavelength path is minimized and the remaining wavelength dispersion value of the second wavelength path falls within the RDR.

Also, WO 2004/088921, for example, discloses a network design technology where a network including multiple channels and paths is divided into partial linear networks each including a terminal node and a branch node. In the disclosed technology, an optical amplifier and a regenerative repeater are assigned to each partial linear network based on the performance of the optical fiber between the nodes, specific paths are formed by combining the partial linear networks, and channel termination devices assigned to the branch nodes are removed based on the signal performance of the specific paths.

Further, Japanese Laid-open Patent Publication No. 2006-042279, for example, discloses a method for determining optimum arrangement (placement or layout) of regenerative repeaters 3R to secure the signal quality of paths in an optical network. In the disclosed method, a network is divided into multiple regenerative repeating sections 3RS each having the regenerative repeaters 3R at both ends, optical amplifiers and optical add/drop multiplexers (OADM) are placed at nodes in the regenerative repeating sections 3RS, multiple assumed paths that are assumed as a result of placing the optical amplifiers and the OADMs are determined, whether the assumed paths are capable of transmission is determined, and the determination results and the assumed paths are displayed to allow the user to reconfigure the network.

SUMMARY

According to an aspect of this disclosure, there is provided a dispersion compensation design system that includes a changing unit configured to set a changed value for the amount of dispersion compensation for at least one of spans connecting nodes constituting an optical network; a path classification unit configured to determine whether respective paths in the optical network are capable of transmission on an assumption that the amount of dispersion compensation is updated with the changed value and classify one or more of the paths as second category paths based on the determination results, in which a path is classified as the second category path if the path itself is incapable of transmission but there is a longer path that includes the path and is capable of transmission; an updating unit configured to compare a retained previous classification result with a latest classification result of the path classification unit and update the amount of dispersion compensation for the at least one of spans with the changed value and retain the latest classification result if the number of the second category paths in the latest classification result is less than the number of the second category paths in the retained previous classification result; and a repeating unit configured, if not all of the paths in the optical network are capable of transmission, to prevent use of combinations of amounts of dispersion compensation applied to the spans in the second category paths in the latest classification result and cause the changing unit, the path classification unit, and the updating unit to repeat the setting of the changed value, the classification of the paths, and the updating of the amount of dispersion compensation.

The object and advantages of the invention will be realized and attained by means of the elements and combinations particularly pointed out in the claims.

It is to be understood that both the foregoing general description and the followed detailed description are exemplary and explanatory and are not restrictive of the invention as claimed.

BRIEF DESCRIPTION OF DRAWINGS

FIG. 2 is a drawing illustrating an exemplary compensation amount menu of a dispersion compensation module;

FIG. 4 is a table illustrating exemplary tolerable ranges of cumulative dispersion;

FIG. 5 is a table illustrating cumulative dispersion from a start node to an end node;

DESCRIPTION OF EMBODIMENTS

Figure 6:
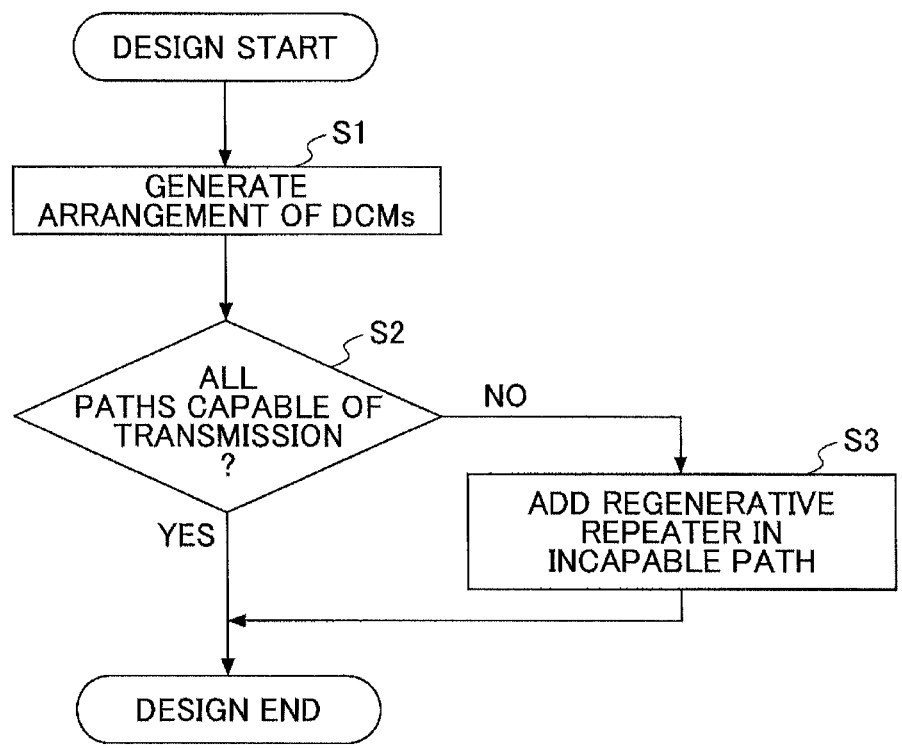
FIG. 6 is a flowchart illustrating a related-art dispersion compensation design process.

With the method of FIG. 6, if not all of the paths are capable of transmission, a regenerative repeater(s) is added in the middle of an incapable path without taking into account the length of the incapable path. Here, in the example of FIGS. 4 through 5, the path N1-N5 is capable of transmission, the path N1-N6 is not capable of transmission, and the path N1-N7 is capable of transmission. When the method of FIG. 6 is applied to this example, a regenerative repeater is automatically placed at the node N5 to divide the path N1-N6 into the path N1-N5 and the path N5-N6 without taking into account that the path N1-N7 is capable of transmission. This approach may increase the number of regenerative repeaters and thereby increases the costs of the network.

Figure 1:
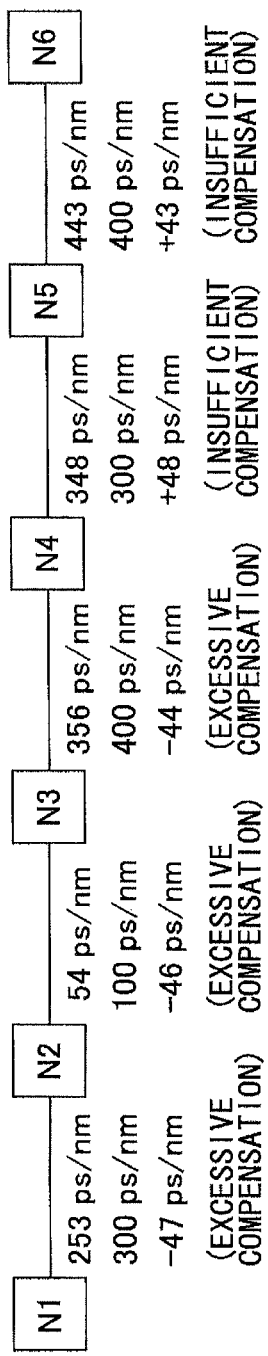
FIG. 1 is a drawing illustrating exemplary dispersion compensation results.
Figure 3:
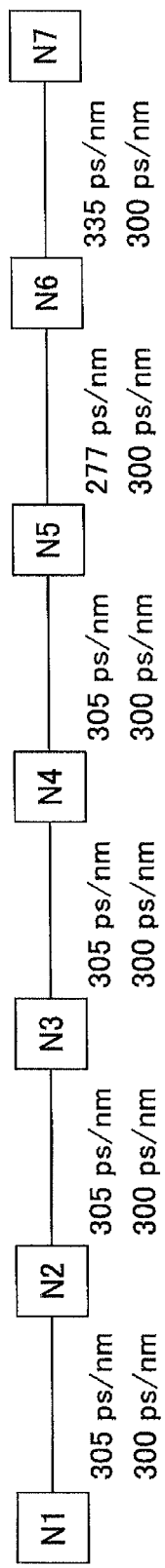
FIG. 3 is a drawing illustrating an exemplary network including seven nodes.
Figure 7:
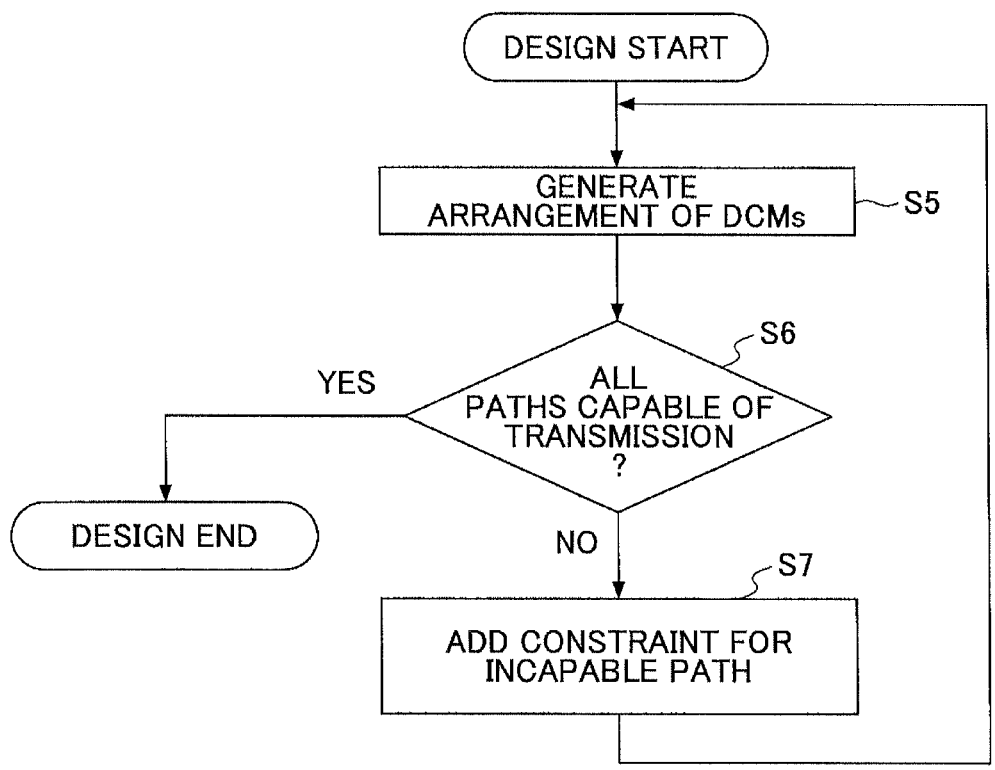
FIG. 7 is a flowchart illustrating another related-art dispersion compensation design process.

In the method of FIG. 7, if a path is not capable of transmission, a constraint that prevents use of the combination of the amounts of dispersion compensation currently applied to the incapable path is added without taking into account the length of the incapable path. Therefore, even when the path N1-N7 is capable of transmission as in the example of FIGS. 3 through 5, a constraint that prevents use of the combination of the amounts of dispersion compensation currently applied to the nodes N1 through N6 is added. Therefore, with the method of FIG. 7, it is difficult to correct a design where a longer path is capable of transmission and a shorter path is not capable of transmission.

When a network is designed with the methods as described above, a shorter path is not always capable of transmission even if a longer path is capable of transmission. Therefore, in operating such a network, even if an existing path is capable of transmission, it is necessary to determine each time whether a shorter path shorter than the existing path is capable of transmission. This in turn increases the workload in network operation and may result in operational errors.

An aspect of this disclosure makes it possible to provide a dispersion compensation design system and a dispersion compensation design method that make it possible to reduce the workload in network operation and reduce operational errors.

Preferred embodiments are described below with reference to the accompanying drawings.

<Configuration of Dispersion Compensation Design System>

Figure 8:
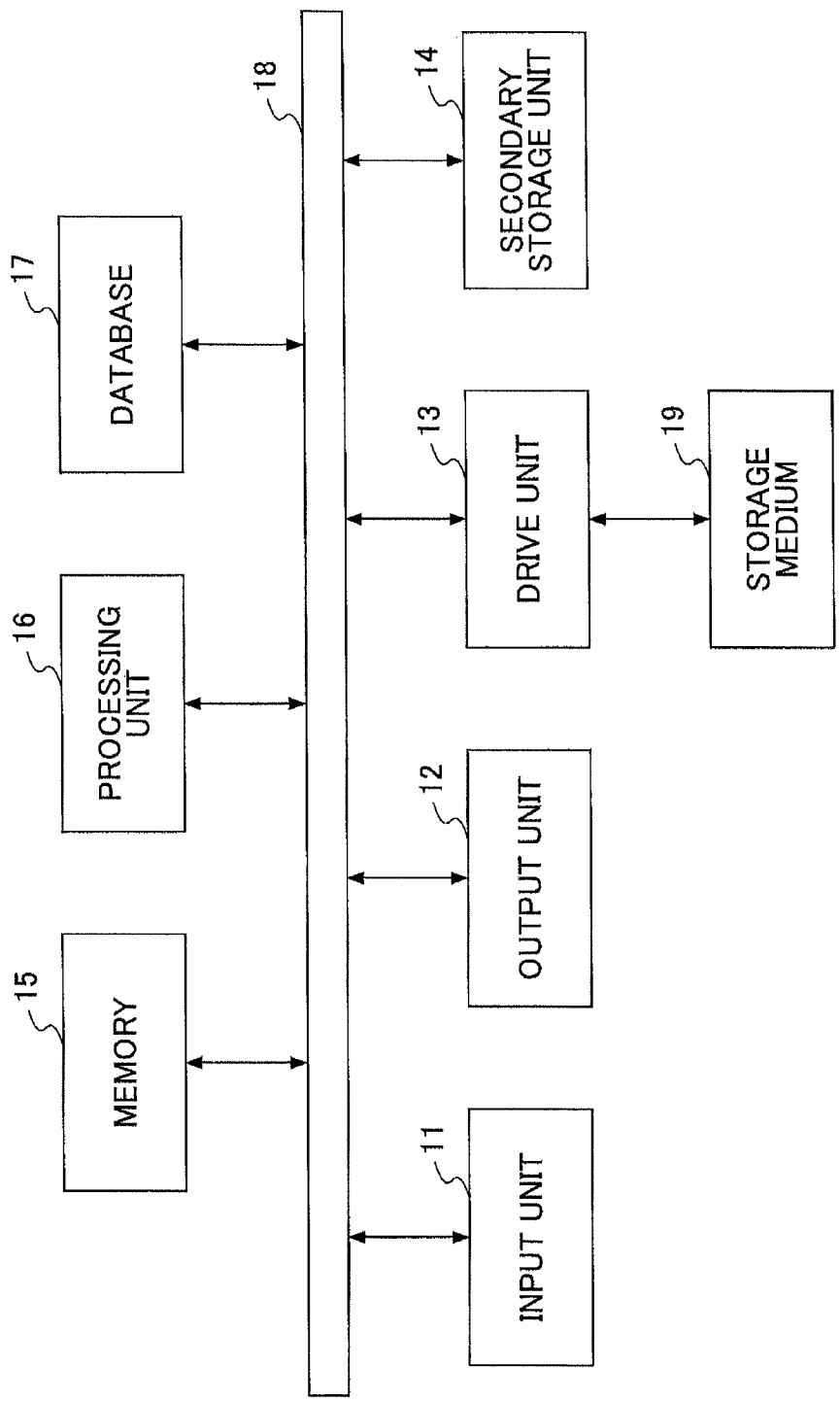
FIG. 8 is a block diagram illustrating an exemplary hardware configuration of a dispersion compensation design system.

FIG. 8 is a block diagram illustrating an exemplary hardware configuration of a dispersion compensation design system. As shown in FIG. 8, the dispersion compensation design system may include an input unit 11, an output unit 12, a drive unit 13, a secondary storage unit 14, a memory 15, a processing unit (processor) 16, and a database 17 that are connected to each other via a system bus 18. The dispersion compensation design system may be implemented by a dedicated apparatus or a general-purpose computer such as a personal computer or a workstation.

The input unit 11 may include a keyboard and a mouse used by the user to input various data. The output unit 12 may include a display that displays various windows and data necessary to operate the dispersion compensation design system according to execution programs. The execution programs may be provided in a storage medium 19 such as a CD-ROM. The storage medium 19 storing the execution programs is mounted on the drive unit 13, and the execution programs stored in the storage medium 19 are installed via the drive unit 13 into the memory 15.

The processing unit 16 controls the entire dispersion compensation design system based on the execution programs read from the memory 15 to perform various calculations and processes as described below. In other words, the processing unit 16 executes the execution programs to control the dispersion compensation design system and thereby implements a changing unit, a path classification unit, an updating unit, and a repeating unit that perform processes and steps as described below. Information necessary for the execution of the execution programs may be obtained from the database 17 and information generated during the execution of the execution programs may be stored in the database 17.

<Dispersion Compensation Design Process>

Figure 9:
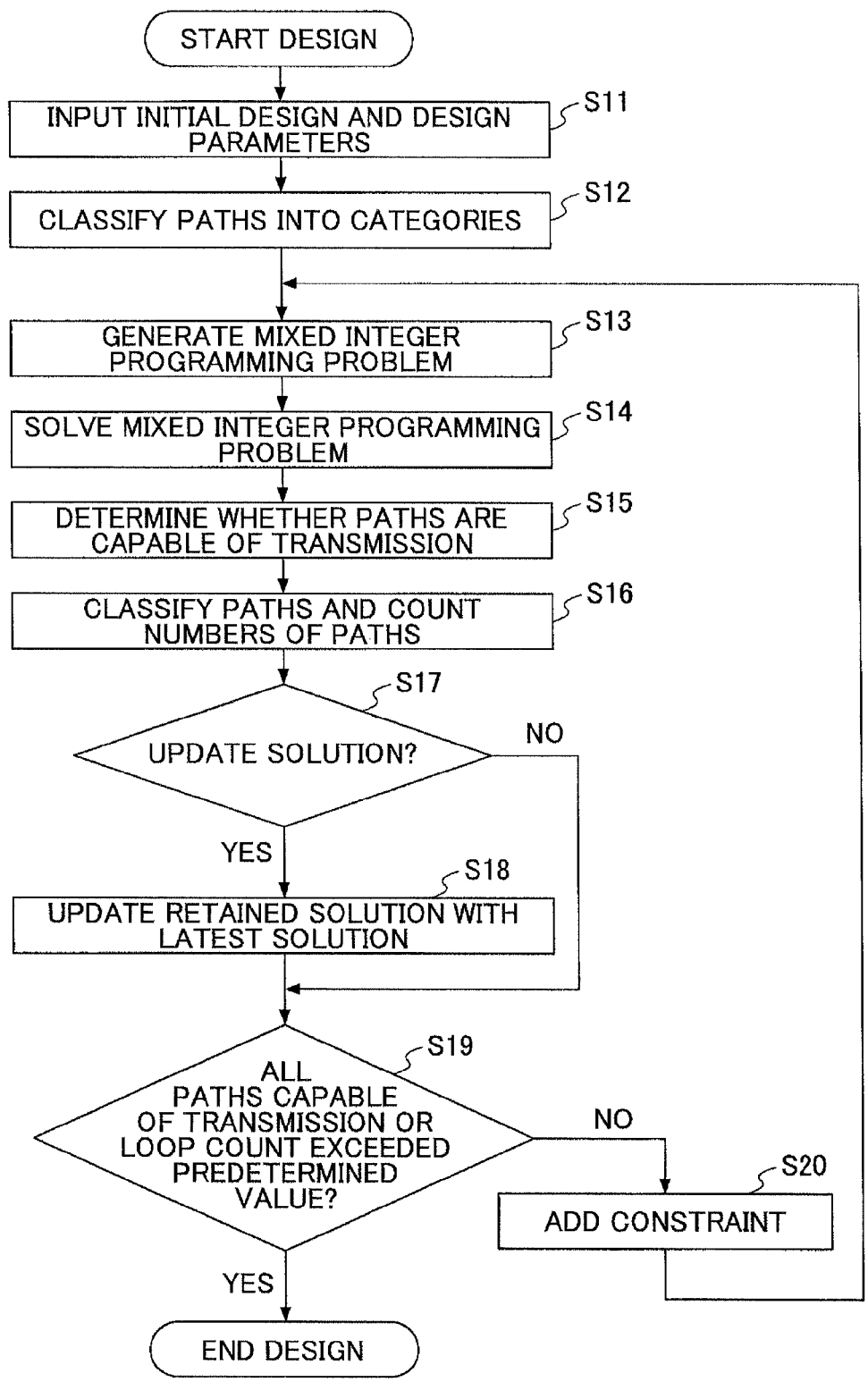
FIG. 9 is a flowchart illustrating an exemplary dispersion compensation design process according to a first embodiment.

FIG. 9 is a flowchart illustrating an exemplary dispersion compensation design process according to a first embodiment. In step S11 of FIG. 9, an initial design and design parameters are input into the dispersion compensation design system. More specifically, the following information items are input into the dispersion compensation design system: information on nodes constituting an optical network, information on connections between the nodes, lengths (or distances) of optical fibers implementing optical transmission lines, information on start and end nodes, the amounts of dispersion, route information including start and end points of paths and lists of nodes along the paths, target values and tolerable ranges of cumulative dispersion at the end points of the paths, an initial design of the arrangement (placement or layout) of DCMs, and transmission capability information indicating whether the respective paths are capable of transmission in the initial design. The optical network is not limited to a linear network. For example, the optical network may be a mesh network or a ring network.

In step S12, the paths are classified based on the route information and the transmission capability information in the initial design. In this example, the paths are classified into three categories: a first category, a second category, and a third category. A path is classified into the first category if the path is capable of transmission and all paths included in the path are also capable of transmission. A path is classified into the second category if the path itself is not capable of transmission but one or more longer paths that include the path are capable of transmission. If a path does not satisfy the conditions of the first and second categories, the path is classified into the third category. Also in step S12, the number of paths in the first category and the number of paths in the second category are counted.

Figure 10:
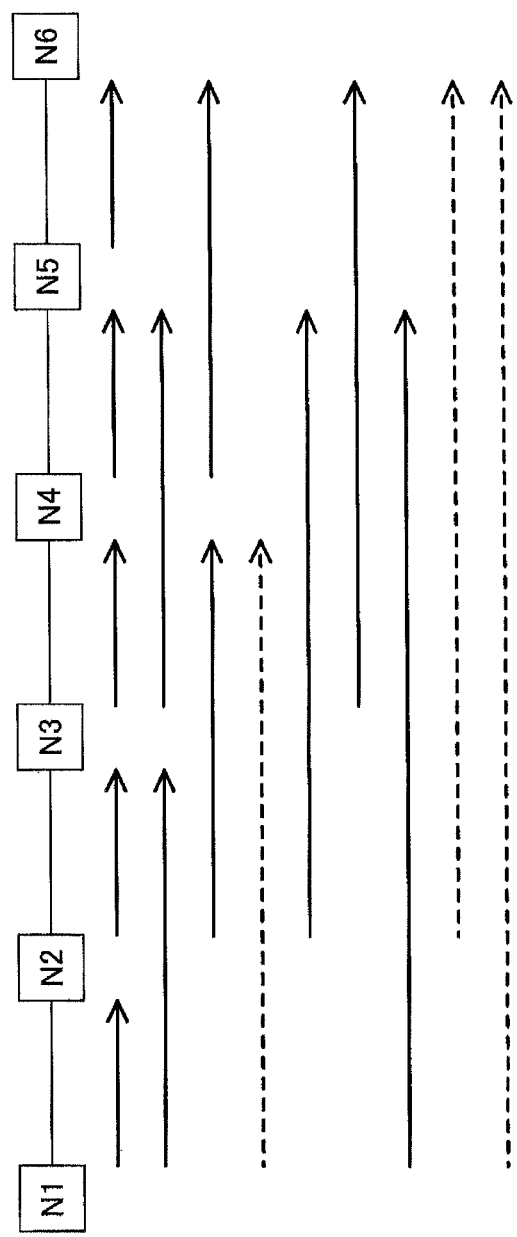
FIG. 10 is a drawing used to describe categorization of paths.

FIG. 10 is a drawing used to describe categorization of paths. In FIG. 10, N1 through N6 indicate nodes, and lines connecting the adjacent nodes indicate spans. Horizontal arrows indicate paths. Among them, solid-line arrows indicate paths that are capable of transmission and dotted-line arrows indicate paths that are not capable of transmission. For example, the path N1-N3 is indicated by a solid-line arrow and is therefore capable of transmission. The route of the path N1-N3 is in the order of N1, N2, and N3. The path N1-N3 includes the path N1-N2 and the path N2-N3 both of which are capable of transmission. Thus, the path N1-N3 satisfies the conditions of the first category and is therefore classified into the first category.

Paths between adjacent nodes (e.g., the path N1-N2) do not include other paths and are therefore classified into the first category if they are capable of transmission. In FIG. 10, the paths N1-N2, N2-N3, N3-N4, N4-N5, N5-N6, N1-N3, N2-N4, N3-N5, N4-N6, N2-N5, and N3-N6 are classified into the first category.

The path N1-N4 is indicated by a dotted-line arrow and is therefore not capable of transmission. The path N1-N5 and the path N1-N6 are longer than and include the entire path N1-N4. The path N1-N6 is indicated by a dotted-line arrow and is not capable of transmission and the path N1-N5 is indicated by a solid-line arrow and is capable of transmission. Thus, the path N1-N4 itself is not capable of transmission but one of longer paths (i.e., the path N1-N5) including the path N1-N4 is capable of transmission. Accordingly, the path N1-N4 is classified into the second category. In the example of FIG. 10, only the N1-N4 is classified into the second category. The remaining paths N1-N5, N2-N6, and N1-N6 that do not satisfy the conditions of the first and second categories are classified into the third category.

In step S13 of FIG. 9, a mixed integer programming problem for designing the arrangement of DCMs with minimum dispersion compensation errors of the paths is generated. Formulas (1) through (4) below represent an objective function and constraints of the mixed integer programming problem.

OBJECT FUNCTION: (1)

$$\text{Minimize } \sum_i (negError[G_i] + posError[G_i])$$

CONSTRAINTS: (2)

$$\sum_t I_{dcm}[l, t] \cdot s[t] = 1 \text{ for } \forall l$$

$$\left\{ D(G) + \sum_t (I_t[G, t] \cdot DCM_{val}[t] \cdot s[t]) \right\} - negError[G] \leq \quad (3)$$

$$rdTarget[G] \text{ (for } \forall G)$$

$$\left\{ D(G) + \sum_t (I_t[G, t] \cdot DCM_{val}[t] \cdot s[t]) \right\} + posError[G] \geq \quad (4)$$

$$rdTarget[G] \text{ (for } \forall G)$$

In the above formulas, negError[Gi] indicates a compensation error when (cumulative dispersion value of path Gi−cumulative dispersion target value of path Gi) is a negative value, and posError[Gi] indicates a compensation error when (cumulative dispersion value of path Gi−cumulative dispersion target value of path Gi) is a positive value. Idcm[l, t] becomes 1 when a compensation amount menu item t is a dispersion compensation candidate for a span l and becomes 0 in other cases. Also, s[t] indicates whether the compensation amount menu item t is selected and becomes 1 when the compensation amount menu item t is selected. D(G) indicates a total amount of dispersion from the start point to the end point of a path G. It[G, t] becomes 1 when the compensation amount menu item t is a dispersion compensation candidate for the path G and becomes 0 in other cases. DCMval[t] indicates the amount of dispersion compensation of the compensation amount menu item t. Also, rdTarget[G] indicates a cumulative dispersion target value of the path G.

The object function of formula (1) is to minimize a total of differences between the cumulative dispersion values and the cumulative dispersion target values at the end points of the respective paths. Formula (2) represents a constraint that only one dispersion compensation module selected from the compensation amount menu needs to be placed at each node. In the pair of formulas (3) and (4), the first term in braces on the left-hand side indicates the amount of cumulative dispersion from the start point to the end point of a path and the second term in the braces indicate a total amount of dispersion compensation from the start point to the end point of the path. The amount of dispersion compensation is opposite in sign to the amount of dispersion of optical fibers, and the sum of the amount of dispersion and the amount of dispersion compensation represents a cumulative dispersion value after dispersion compensation. Also in formulas (3) and (4), the second term on the left-hand side is a variable indicating a dispersion compensation error and the right-hand side is a cumulative dispersion target value at the end point of each path. The cumulative dispersion target value is input in step S11 described above.

In step S14 of FIG. 9, the mixed integer programming problem is solved. There are known methods for solving mixed integer programming problems. For example, a method disclosed in "Optimization of discrete systems", Masatoshi Sakawa, Mori Publishing Co, Ltd., May 2000 may be used to solve the mixed integer programming problem. In step S15, whether the respective paths are capable of transmission is determined. In this step, whether the amount of cumulative dispersion at the end point of each path is within the tolerable range of cumulative dispersion at the end point of the path is determined. If the amount of cumulative dispersion is within the tolerable range, the path is determined to be capable of transmission. Meanwhile, if the amount of cumulative dispersion is out of the tolerable range, the path is determined to be not capable of transmission. Also in this step, the number of paths that are determined to be capable of transmission is counted.

In step S16, the paths are classified into categories and the numbers of paths in the categories are counted. In this step, the paths are classified into the categories that are also used in step S12 based on the route information and the determination results of step S15. Also, the number of paths in the first category and the number of paths in the second category are counted.

In step S17, the number of second category paths (paths in the second category) in a retained classification result obtained and stored in the previous classification step (i.e., step S16 previously performed) is compared with the number of second category paths in the latest classification result obtained in the latest classification step (i.e., step S16 most recently performed) to determine whether to update the solution. This process represents an update determining process of the first embodiment. If the obtained number of second category paths is less than the retained number of second category paths, a retained solution obtained and stored previously is updated with the latest (newly-obtained) solution. For example, the solution may include the arrangement of DCMs and variables obtained by solving the mixed integer programming problem and may be retained in the memory 15. When the retained solution is updated, the latest solution and the numbers of paths in the first and second categories obtained using the latest solution are retained in, for example, the memory 15. The initial values of the solution to be stored may be provided as the initial design. Alternatively, a solution obtained for the first time may always be retained without taking into account the result of step S17

In step S19, whether all the paths are capable of transmission and whether a loop count (i.e., the number of times the arrangement of DCMs is generated) has exceeded a predetermined value (a predetermined number of times) are determined. If there is no solution that makes all the paths capable of transmission, it is necessary to terminate the process after the loop is repeated for a predetermined number of times. The predetermined number of times may be, for example, several tens to several hundreds. If all the paths are capable of transmission or the loop count has exceeded the predetermined value, the dispersion compensation design process is terminated and the solution that is retained when the process is terminated is used as the design result. Meanwhile, if one or more of the paths is incapable of transmission and the loop count is less than or equal to the predetermined value, a constraint that prevents use of the combinations of the amounts of dispersion compensation currently applied to the incapable paths is added in step S20, and the process returns to step S13

Formula (5) below represents a constraint that is added in step S20. The constraint prevents a combination of the amounts of dispersion compensation applied to a path in the second category from being selected again.

$$\Sigma(\text{selected } s[t] \text{on} G_2) \le \text{numberOfSpan} - 1 \quad (5)$$

In formula (5), $G_2$ indicates a path classified into the second category, selected $s[t]$ on $G_2$ indicates whether the compensation amount menu item t applied to a span of the path is selected, and $\Sigma$ indicates a total of selected $s[t]$ on $G_2$. Also in formula (5), numberOfSpan indicates the number of spans of the path.

The above configuration of the first embodiment makes it possible to reduce the number of second category paths and thereby makes it possible to reduce the workload in network operation and reduce operational errors.

<Update Determining Process of Second Embodiment>

Figure 11:
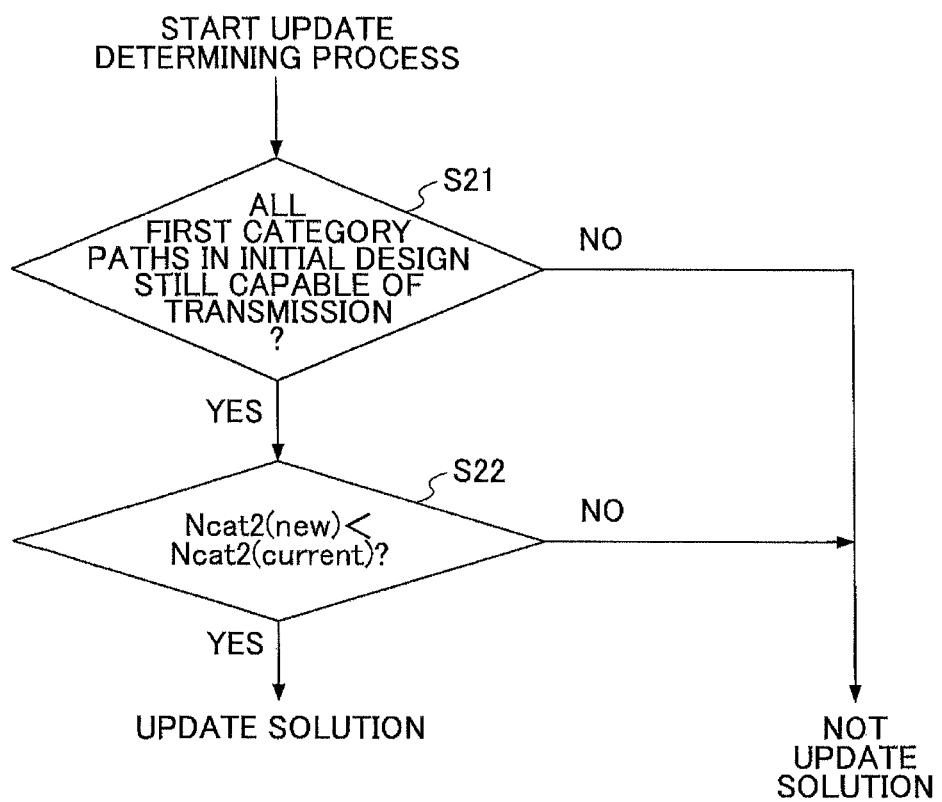
FIG. 11 is a flowchart illustrating an exemplary update determining process according to a second embodiment.

FIG. 11 is a flowchart illustrating an update determining process according to a second embodiment. The update determining process corresponds to step S17 of FIG. 9. With the update determining process of the first embodiment, a retained solution is updated with a newly-obtained (latest) solution even if a path classified into the first category in the initial design is incapable of transmission in the latest solution. To prevent this problem, in the second embodiment, if a path classified into the first category in the initial design is incapable of transmission in the latest solution, the retained solution is not updated.

In step S21 of FIG. 11, it is determined whether all paths classified into the first category in the initial design are still capable of transmission in the latest solution. If at least one of the paths is incapable of transmission in the latest solution, the retained solution is not updated. If all the paths classified into the first category in the initial design are still capable of transmission in the latest solution, the process proceeds to step S22. In step S22, a number of second category paths (paths classified into the second category) Ncat2(new) in the latest solution is compared with a number of second category paths Ncat2(current) in the retained solution. If the number of second category paths Ncat2 (new) is less than the number of second category paths Ncat2 (current), the retained solution is updated. Meanwhile, if the number of second category paths Ncat2(new) is not less than the number of second category paths Ncat2(current), the retained solution is not updated.

The above configuration of the second embodiment makes it possible to reduce the number of paths classified into the second category without decreasing the number of first category paths, and thereby makes it possible to reduce the workload in network operation and reduce operational errors.

<Update Determining Process of Third Embodiment>

Figure 12:
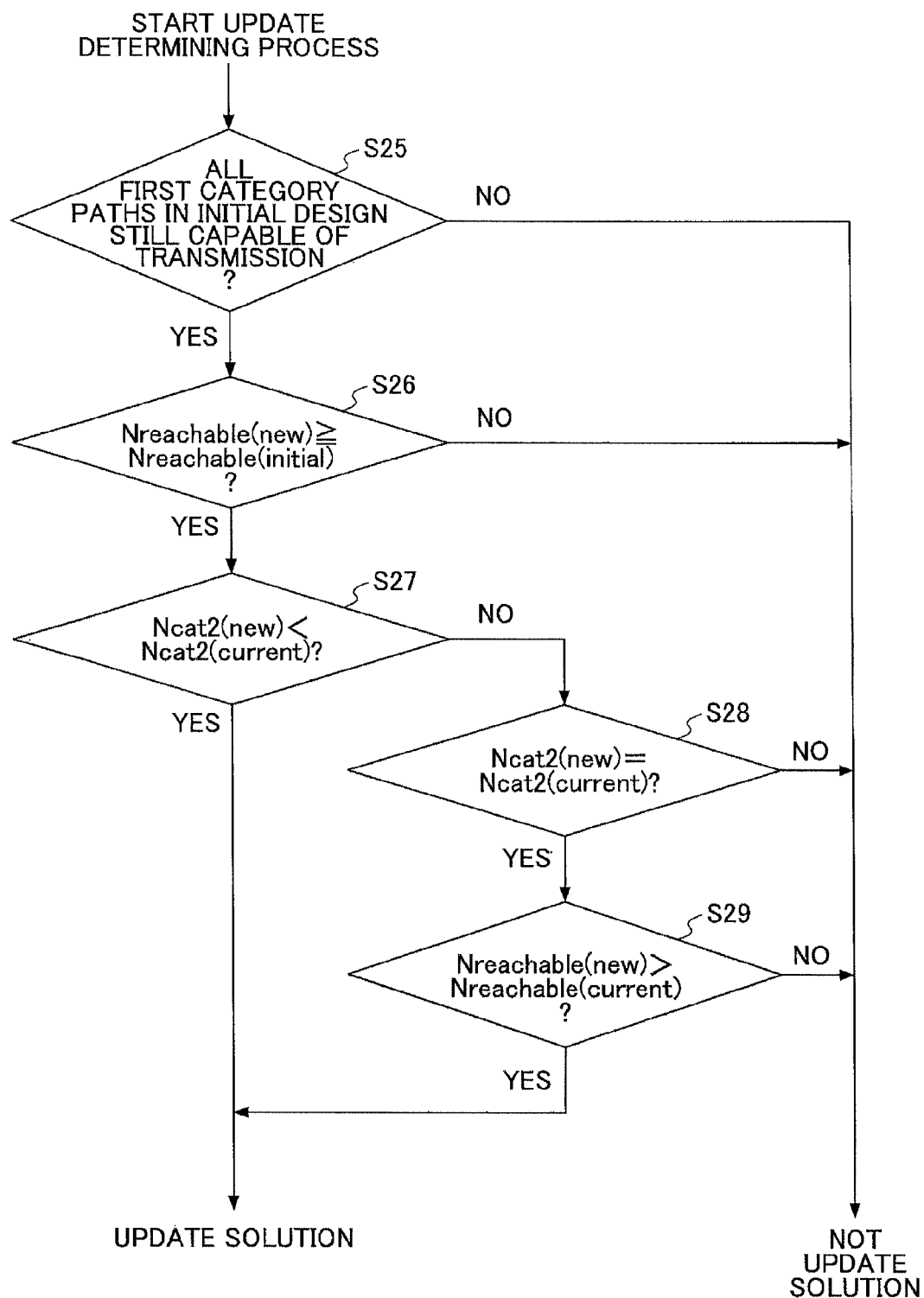
FIG. 12 is a flowchart illustrating an exemplary update determining process according to a third embodiment.

FIG. 12 is a flowchart illustrating an update determining process according to a third embodiment. The update determining process corresponds to step S17 of FIG. 9. In step S25 of FIG. 12, it is determined whether all paths classified into the first category in the initial design are still capable of transmission in the latest solution. If at least one of the paths is incapable of transmission in the latest solution, the retained solution is not updated. If all the paths classified into the first category in the initial design are still capable of transmission in the latest solution, the process proceeds to step S26. In step S26, it is determined whether a number of reachable paths (paths capable of transmission) Nreachable(new) in the latest solution is greater than or equal to a number of reachable paths Nreachable(initial) in the initial design. If the number of reachable paths Nreachable(new) is greater than or equal to the number of reachable paths Nreachable(initial), the process proceeds to step S27. If the number of reachable paths Nreachable(new) is less than the number of reachable paths Nreachable(initial), the retained solution is not updated.

In step S27, a number of second category paths Ncat2(new) in the latest solution is compared with a number of second category paths Ncat2(current) in the retained solution. If the number of second category paths Ncat2(new) is less than the number of second category paths Ncat2(current), the retained solution is updated. Otherwise, the process proceeds to step S28.

In step S28, it is determined whether the number of second category paths Ncat2(new) equals the number of second category paths Ncat2(current). If Ncat2(new) equals Ncat2(current), the process proceeds to step S29. Otherwise, the retained solution is not updated. In step S29, the number of reachable paths Nreachable(new) is compared with a number of reachable paths Nreachable(current) in the retained solution. If Nreachable(new) is greater than Nreachable(current), the retained solution is updated. Otherwise, the retained solution is not updated.

Thus, the third embodiment uses stricter conditions (update determining conditions) to determine whether to update the retained solution. This configuration makes it possible to obtain a solution where the number of paths capable of transmission is greater than or equal to that in the initial design and thereby makes it possible to reduce the workload in network operation and reduce operational errors.

<Update Determining Process of Fourth Embodiment>

Figure 13:
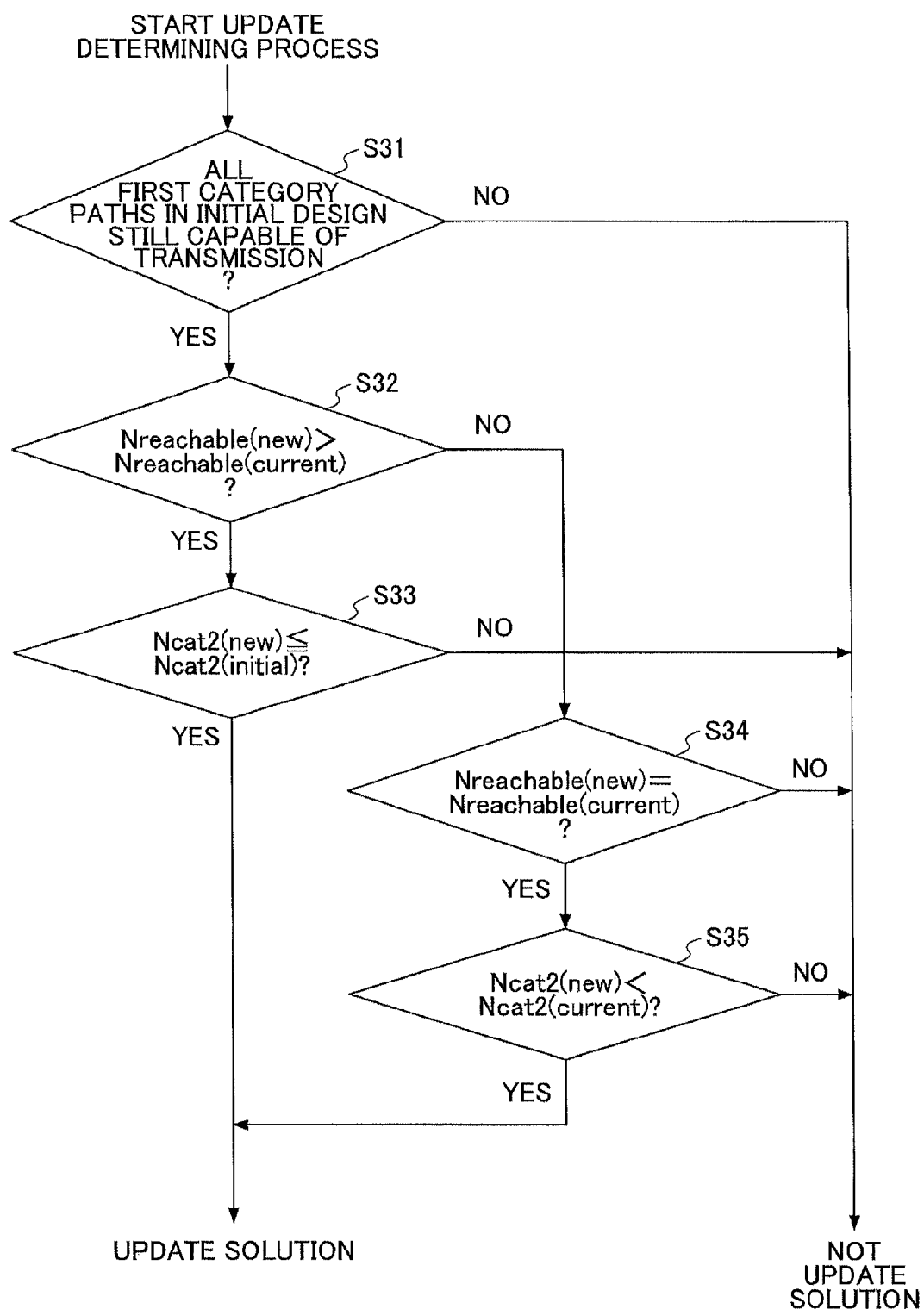
FIG. 13 is a flowchart illustrating an exemplary update determining process according to a fourth embodiment.

FIG. 13 is a flowchart illustrating an update determining process according to a fourth embodiment. The update determining process corresponds to step S17 of FIG. 9. In step S31 of FIG. 13, it is determined whether all paths classified into the first category in the initial design are still capable of transmission in the latest solution. If at least one of the paths is incapable of transmission in the latest solution, the retained solution is not updated. If all the paths classified into the first category in the initial design are still capable of transmission in the latest solution, the process proceeds to step S32. In step S32, the number of reachable paths Nreachable(new) in the latest solution is compared with the number of reachable paths Nreachable(current) in the retained solution. If Nreachable(new) is greater than Nreachable(current), the process proceeds to step S33. Otherwise, the process proceeds to step S34.

In step S33, the number of second category paths Ncat2 (new) in the latest solution is compared with a number of second category paths Ncat2(initial) in the initial design. If Ncat2(new) is less than or equal to Ncat2(initial), the retained solution is updated. Otherwise, the retained solution is not updated.

In step S34, it is determined whether the number of reachable paths Nreachable(new) equals the number of reachable paths Nreachable(current). If Nreachable(new) equals Nreachable(current), the process proceeds to step S35. Otherwise, the retained solution is not updated. In step S35, the number of second category paths Ncat2(new) is compared with the number of second category paths Ncat2(current). If Ncat2(new) is less than Ncat2(current), the retained solution is updated. Otherwise, the retained solution is not updated.

Similarly to the third embodiment, the above configuration of the fourth embodiment makes it possible to obtain a solution where the number of paths capable of transmission is greater than or equal to that in the initial design.

<Update Determining Process of Fifth Embodiment>

Figure 14:
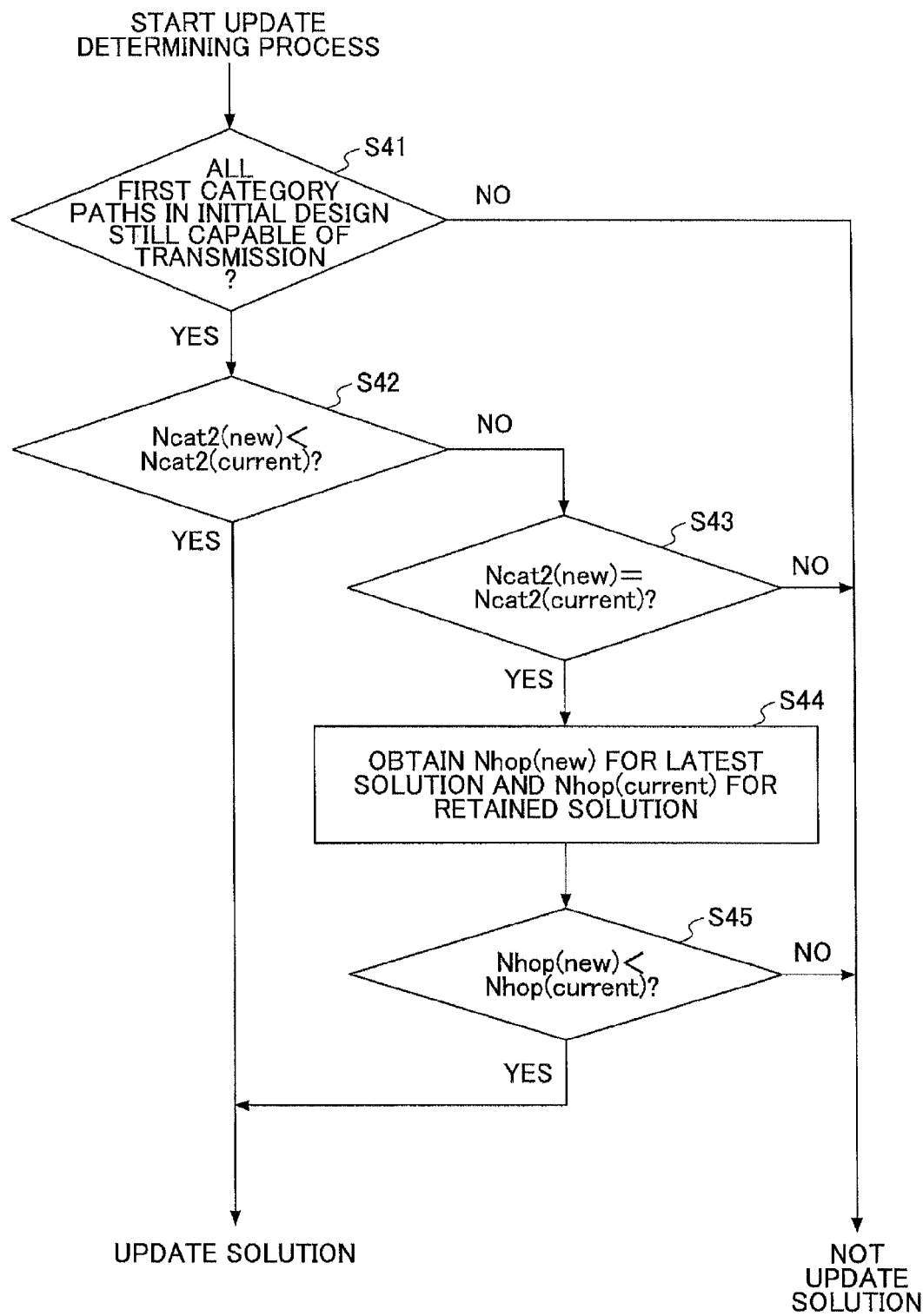
FIG. 14 is a flowchart illustrating an exemplary update determining process according to a fifth embodiment.

FIG. 14 is a flowchart illustrating an update determining process according to a fifth embodiment. The update determining process corresponds to step S17 of FIG. 9. In step S41 of FIG. 14, it is determined whether all paths classified into the first category in the initial design are still capable of transmission in the latest solution. If at least one of the paths is incapable of transmission in the latest solution, the retained solution is not updated. If all the paths classified into the first category in the initial design are still capable of transmission in the latest solution, the process proceeds to step S42. In step S42, the number of second category paths Ncat2(new) in the latest solution is compared with the number of second category paths Ncat2(current) in the retained solution. If Ncat2(new) is less than Ncat2(current), the retained solution is updated. Otherwise, the process proceeds to step S43.

In step S43, it is determined whether the number of second category paths Ncat2(new) equals the number of second category paths Ncat2(current). If Ncat2(new) equals Ncat2(current), the process proceeds to step S44. Otherwise, the retained solution is not updated. In step S44, in each of the latest solution and the retained solution, a weight that decreases as the number of hops in the route (path) is obtained for each of the second category paths and obtained weights of the second category paths are totaled. The total weight for the latest solution is called Nhop(new), and the total weight for the retained solution is called Nhop(current). For example, the weight may be calculated by subtracting the number of hops from a predetermined constant. The number of hops equals the number of nodes along a path excluding the start point node.

In step S45, the total weight Nhop(new) is compared with the total weight Nhop(current). If Nhop(new) is less than Nhop(current), the retained solution is updated. Otherwise, the retained solution is not updated. Alternatively, the total number of hops of the second category paths in the latest solution and the total number of hops of the second category paths in the retained solution may be compared with each other, and the retained solution may be updated if the total number of hops of the second category paths in the latest solution is greater than the total number of hops of the second category paths in the retained solution.

The above configuration of the fifth embodiment makes it possible to reduce the number of "short" second category paths. This configuration is based on an assumption that longer second category paths are less harmful to the network performance than shorter second category paths. In general, there is greater demand for shorter paths than for longer paths. Therefore, it is preferable to decrease the number of short secondary category paths.

<Update Determining Process of Sixth Embodiment>

Figure 15:
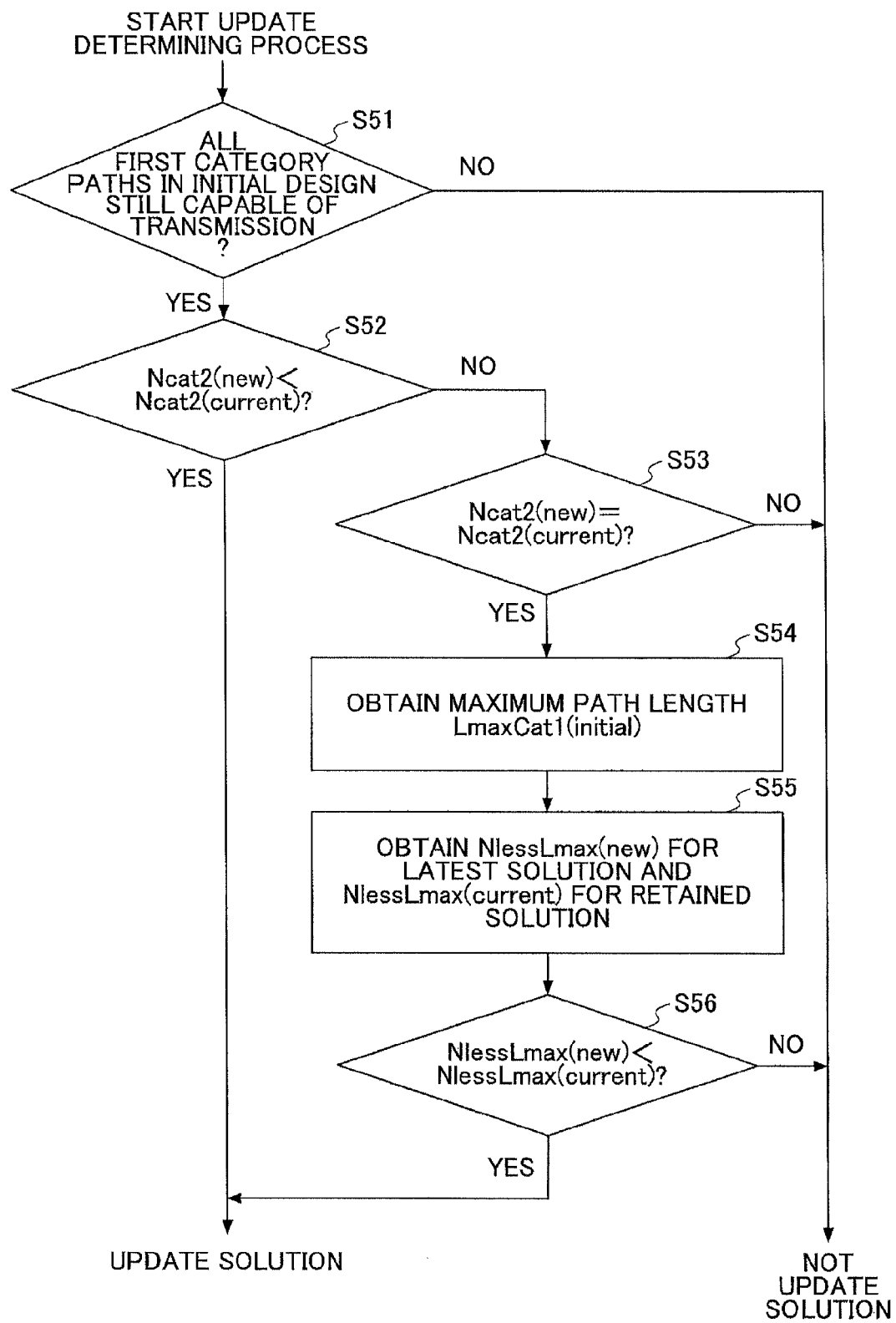
FIG. 15 is a flowchart illustrating an exemplary update determining process according to a sixth embodiment.

FIG. 15 is a flowchart illustrating an update determining process according to a sixth embodiment. The update determining process corresponds to step S17 of FIG. 9. In step S51 of FIG. 15, it is determined whether all paths classified into the first category in the initial design are still capable of transmission in the latest solution. If at least one of the paths is incapable of transmission in the latest solution, the retained solution is not updated. If all the paths classified into the first category in the initial design are still capable of transmission in the latest solution, the process proceeds to step S52. In step S52, the number of second category paths Ncat2(new) in the latest solution is compared with the number of second category paths Ncat2(current) in the retained solution. If Ncat2(new) is less than Ncat2(current), the retained solution is updated. Otherwise, the process proceeds to step S53.

In step S53, it is determined whether Ncat2(new) equals Ncat2(current). If Ncat2(new) equals Ncat2(current), the process proceeds to step S54. Otherwise, the retained solution is not updated. In step S54, a maximum path length LmaxCat1 (initial) is obtained. The maximum path length LmaxCat1 (initial) indicates the largest path length among the path lengths of first category paths in the solution of the initial design. The path length may be represented, for example, by the number of hops or the total length (or distance) of optical fibers. This definition of "path length" may also apply to other embodiments.

In step S55, for each of the latest solution and the retained solution, the number of second category paths whose path lengths (the numbers of hops) are less than LmaxCat1(initial) is obtained. Here, the number obtained for the latest solution is called NlessLmax(new) and the number obtained for the retained solution is called NlessLmax(current). In step S56, NlessLmax(new) is compared with NlessLmax(current). If NlessLmax(new) is less than NlessLmax(current), the retained solution is updated. Otherwise, the retained solution is not updated.

The above configuration of the sixth embodiment makes it possible to reduce the number of "short" second category paths.

<Update Determining Process of Seventh Embodiment>

Figure 16:
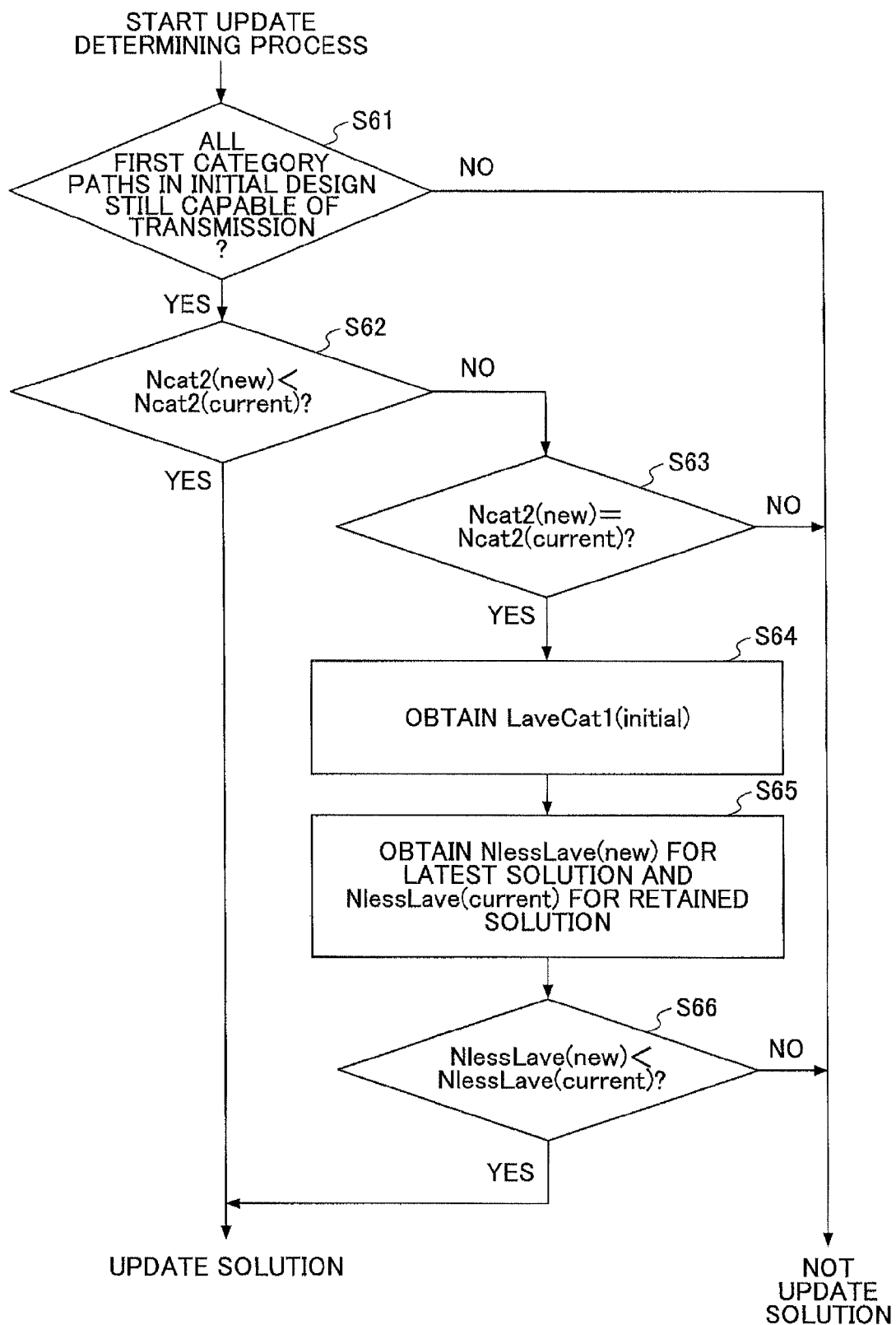
FIG. 16 is a flowchart illustrating an exemplary update determining process according to a seventh embodiment.

FIG. 16 is a flowchart illustrating an update determining process according to a seventh embodiment. The update determining process corresponds to step S17 of FIG. 9. In step S61 of FIG. 16, it is determined whether all paths classified into the first category in the initial design are still capable of transmission in the latest solution. If at least one of the paths is incapable of transmission in the latest solution, the retained solution is not updated. If all the paths classified into the first category in the initial design are still capable of transmission in the latest solution, the process proceeds to step S62. In step S62, the number of second category paths Ncat2(new) in the latest solution is compared with the number of second category paths Ncat2(current) in the retained solution. If Ncat2(new) is less than Ncat2(current), the retained solution is updated. Otherwise, the process proceeds to step S63.

In step S63, it is determined whether Ncat2(new) equals Ncat2(current). If Ncat2(new) equals Ncat2(current), the process proceeds to step S64. Otherwise, the retained solution is not updated. In step S64, for each first category path in the solution of the initial design, it is determined whether there is a path that includes the entire first category path, is longer than the first category path by one hop, and is not capable of transmission. If there is such a path, the first category path is selected. Then, an average of the path lengths of selected first category paths are obtained as a reference value LaveCat1 (initial). Here, the path length of a path differs depending on the direction in which the path extends. For example, the length of a first extended path that is obtained by extending an original path from its start point in a direction opposite to the end point may differ from the length of a second extended path that is obtained by extending the original path from its end point in a direction opposite to the start point. Therefore, in this exemplary process, largest path lengths may be obtained for the respective directions and an average of the largest path lengths may be obtained as the reference value LaveCat1(initial).

In step S65, for each of the latest solution and the retained solution, the number of second category paths whose path lengths are less than LaveCat1(initial) is obtained. Here, the number obtained for the latest solution is called NlessLave (new) and the number obtained for the retained solution is called NlessLave(current). In step S66, NlessLave(new) is compared with NlessLave(current). If NlessLave(new) is less than NlessLave(current), the retained solution is updated. Otherwise, the retained solution is not updated.

In other words, if the number of second category paths whose path lengths are less than the reference value is reduced with the latest solution, the retained solution is updated with the latest solution. The above configuration of the seventh embodiment makes it possible to reduce the number of "short" second category paths.

<Update Determining Process of Eighth Embodiment>

Figure 17:
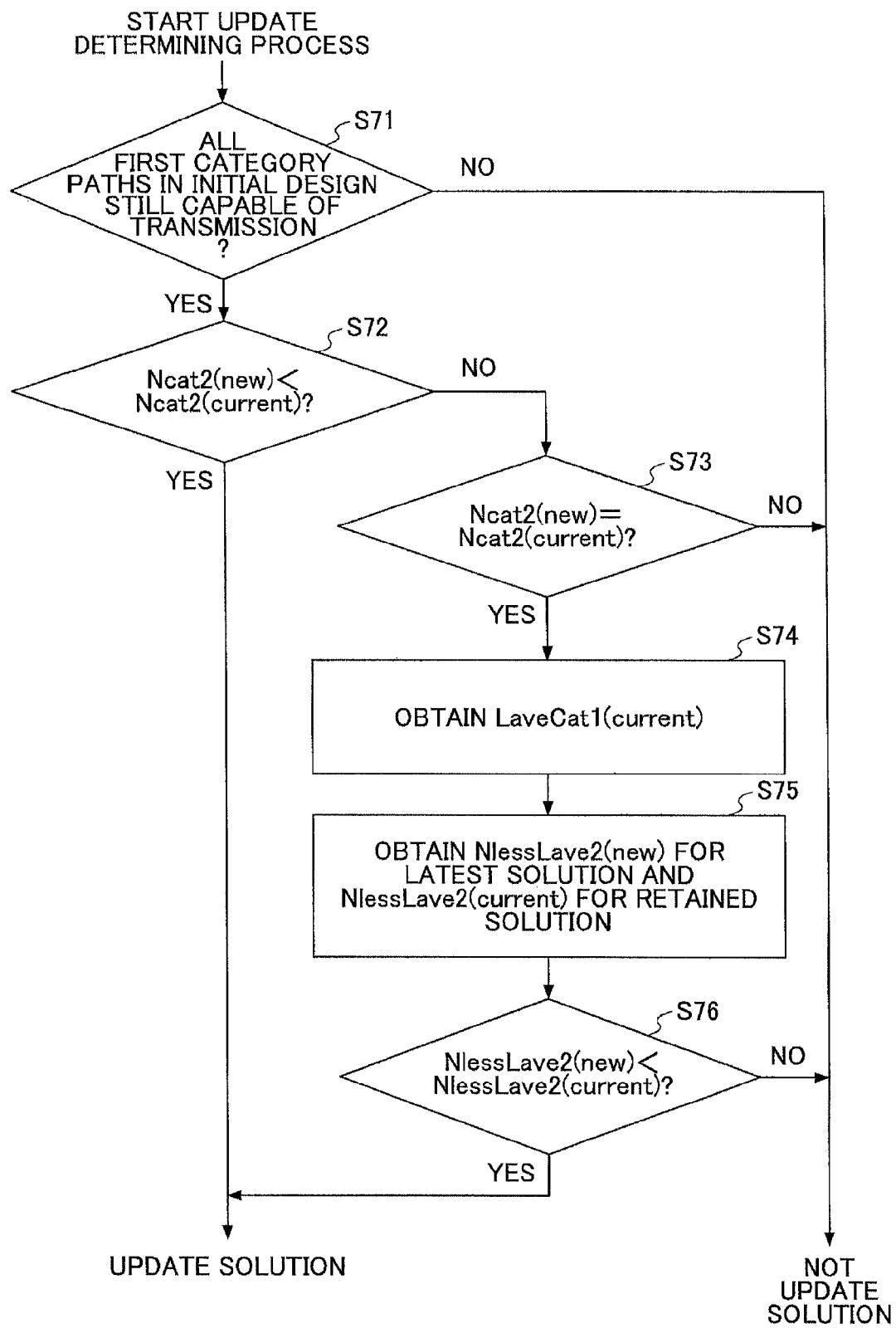
FIG. 17 is a flowchart illustrating an exemplary update determining process according to an eighth embodiment.

FIG. 17 is a flowchart illustrating an update determining process according to an eighth embodiment. The update determining process corresponds to step S17 of FIG. 9. In step S71 of FIG. 17, it is determined whether all paths classified into the first category in the initial design are still capable of transmission in the latest solution. If at least one of the paths is incapable of transmission in the latest solution, the retained solution is not updated. If all the paths classified into the first category in the initial design are still capable of transmission in the latest solution, the process proceeds to step S72. In step S72, the number of second category paths Ncat2(new) in the latest solution is compared with the number of second category paths Ncat2(current) in the retained solution. If Ncat2 (new) is less than Ncat2(current), the retained solution is updated. Otherwise, the process proceeds to step S73.

In step S73, it is determined whether Ncat2(new) equals Ncat2(current). If Ncat2(new) equals Ncat2(current), the process proceeds to step S74. Otherwise, the retained solution is not updated. In step S74, for each first category path in the retained solution, it is determined whether there is a path that includes the entire first category path, is longer than the first category path by one hop, and is not capable of transmission. If there is such a path, the first category path is selected. Then, an average of the path lengths of selected first category paths are obtained as a reference value LaveCat1(current).

In step S75, for each of the latest solution and the retained solution, the number of second category paths whose path lengths are less than LaveCat1(current) is obtained. Here, the number obtained for the latest solution is called NlessLave2 (new) and the number obtained for the retained solution is called NlessLave2(current). In step S76, NlessLave2(new) is compared with NlessLave2(current). If NlessLave2(new) is less than NlessLave2(current), the retained solution is updated. Otherwise, the retained solution is not updated.

In other words, if the number of second category paths whose path lengths are less than the reference value is reduced with the latest solution, the retained solution is updated with the latest solution. The above configuration of the eighth embodiment makes it possible to reduce the number of "short" second category paths.

<Update Determining Process of Ninth Embodiment>

Figure 18:
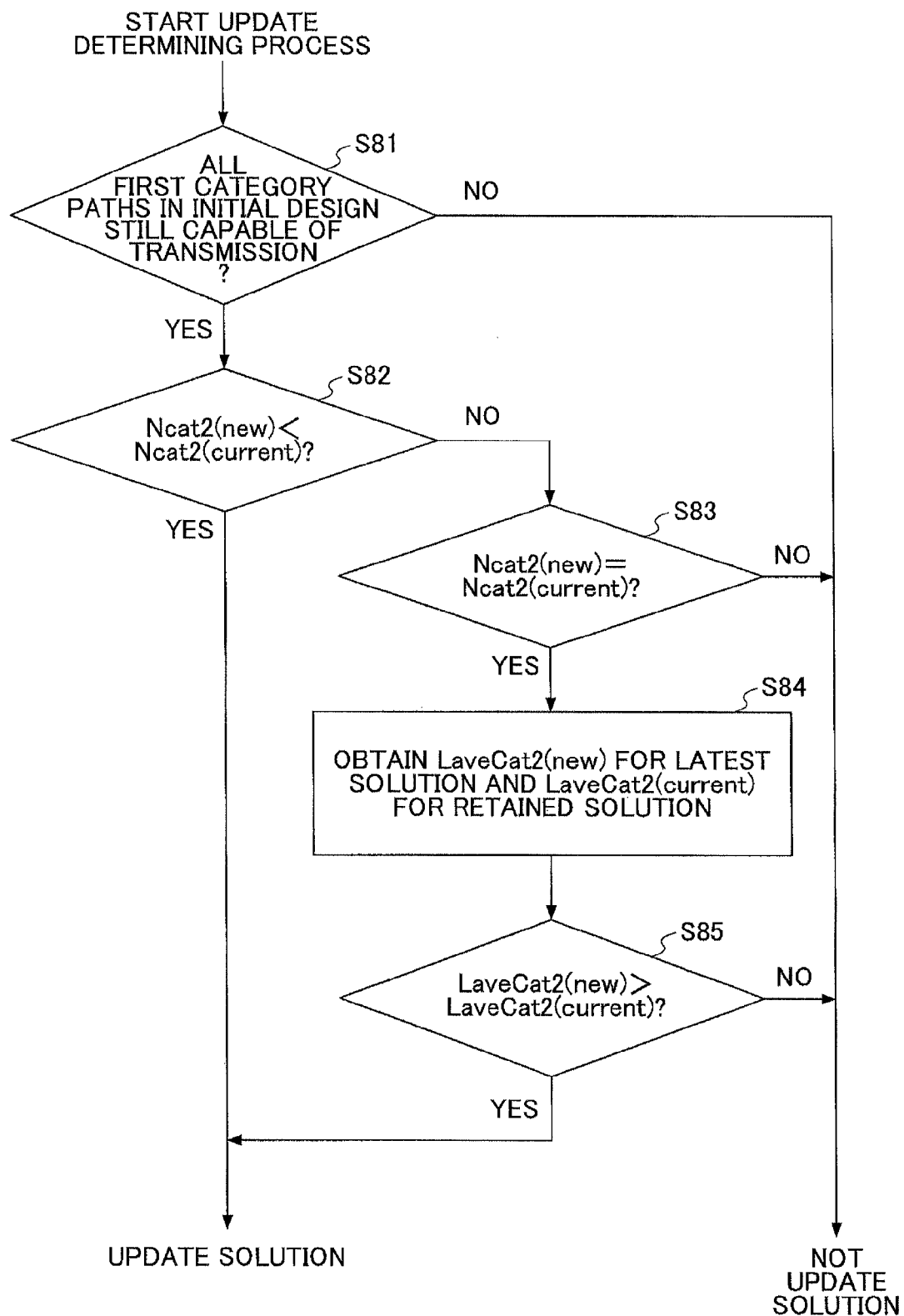
FIG. 18 is a flowchart illustrating an exemplary update determining process according to a ninth embodiment.

FIG. 18 is a flowchart illustrating an update determining process according to a ninth embodiment. The update determining process corresponds to step S17 of FIG. 9. In step S81 of FIG. 18, it is determined whether all paths classified into the first category in the initial design are still capable of transmission in the latest solution. If at least one of the paths is incapable of transmission in the latest solution, the retained solution is not updated. If all the paths classified into the first category in the initial design are still capable of transmission in the latest solution, the process proceeds to step S82. In step S82, the number of second category paths Ncat2(new) in the latest solution is compared with the number of second category paths Ncat2(current) in the retained solution. If Ncat2 (new) is less than Ncat2(current), the retained solution is updated. Otherwise, the process proceeds to step S83.

In step S83, it is determined whether Ncat2(new) equals Ncat2(current). If Ncat2(new) equals Ncat2(current), the process proceeds to step S84. Otherwise, the retained solution is not updated. In step S84, an average LaveCat2(new) of the path lengths of second category paths in the latest solution and an average LaveCat2(current) of the path lengths of second category paths in the retained solution are calculated. In step S85, LaveCat2(new) is compared with LaveCat2(current). If LaveCat2(new) is greater than LaveCat2(current), the retained solution is updated. Otherwise, the retained solution is not updated.

In other words, if the average path length of second category paths is increased with the latest solution, the retained solution is updated with the latest solution. The above configuration of the ninth embodiment makes it possible to reduce the number of "short" second category paths.

<Update Determining Process of Tenth Embodiment>

Figure 19:
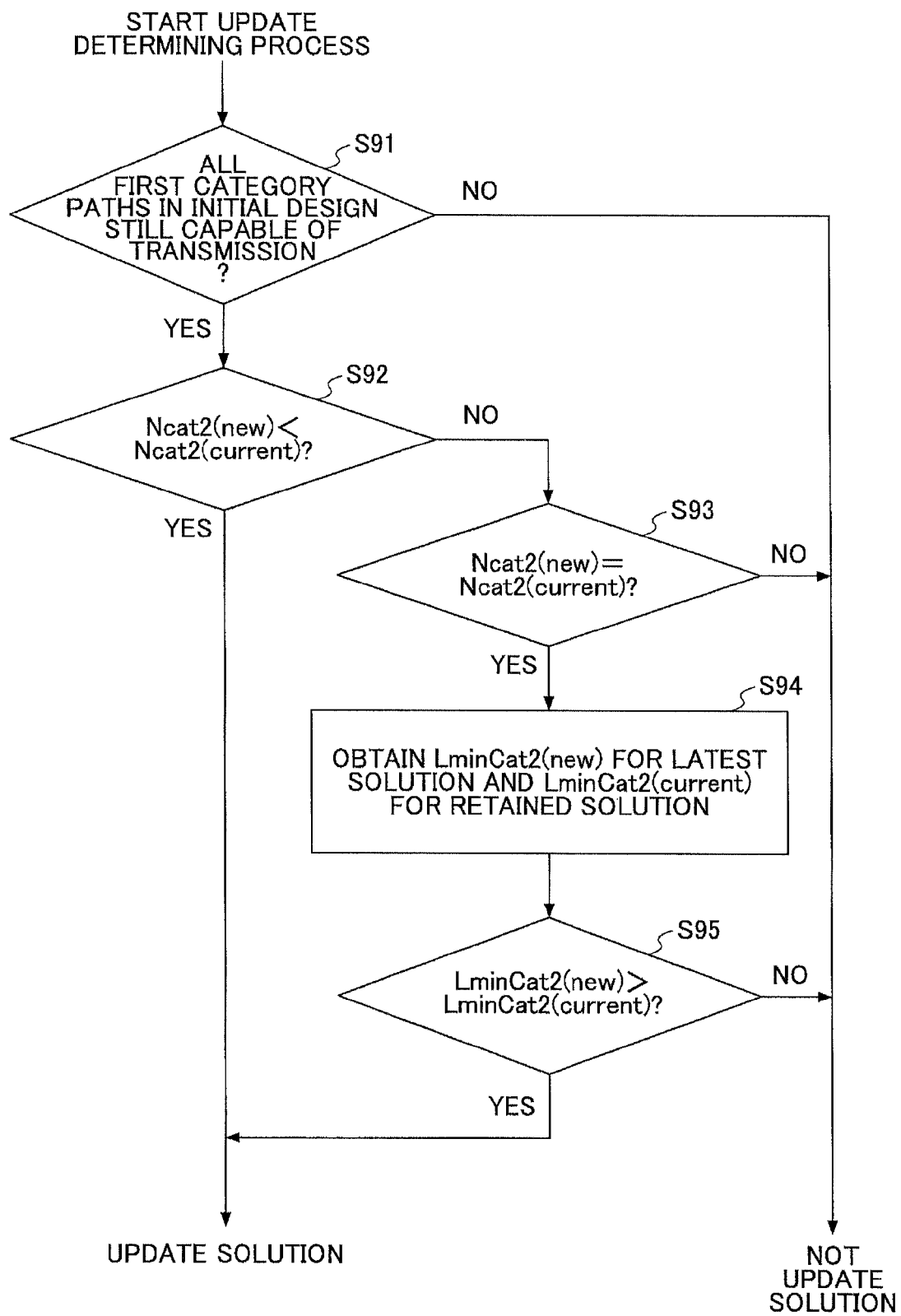
FIG. 19 is a flowchart illustrating an exemplary update determining process according to a tenth embodiment.

FIG. 19 is a flowchart illustrating an update determining process according to a tenth embodiment. The update determining process corresponds to step S17 of FIG. 9. In step S91 of FIG. 19, it is determined whether all paths classified into the first category in the initial design are still capable of transmission in the latest solution. If at least one of the paths is incapable of transmission in the latest solution, the retained solution is not updated. If all the paths classified into the first category in the initial design are still capable of transmission in the latest solution, the process proceeds to step S92. In step S92, the number of second category paths Ncat2(new) in the latest solution is compared with the number of second category paths Ncat2(current) in the retained solution. If Ncat2 (new) is less than Ncat2(current), the retained solution is updated. Otherwise, the process proceeds to step S93.

In step S93, it is determined whether Ncat2(new) equals Ncat2(current). If Ncat2(new) equals Ncat2(current), the process proceeds to step S94. Otherwise, the retained solution is not updated. In step S94, LminCat2(new) indicating the smallest path length among the path lengths of second category paths in the latest solution and LminCat2(current) indicating the smallest path length among the path lengths of second category paths in the retained solution are obtained. In step S95, LminCat2(new) is compared with LminCat2(current). If LminCat2(new) is greater than LminCat2(current), the retained solution is updated. Otherwise, the retained solution is not updated.

In other words, if the smallest path length of the second category paths is increased with the latest solution, the retained solution is updated with the latest solution. The above configuration of the tenth embodiment makes it possible to reduce the number of "short" second category paths.

<Variation of Dispersion Compensation Design Process>

Figure 20:
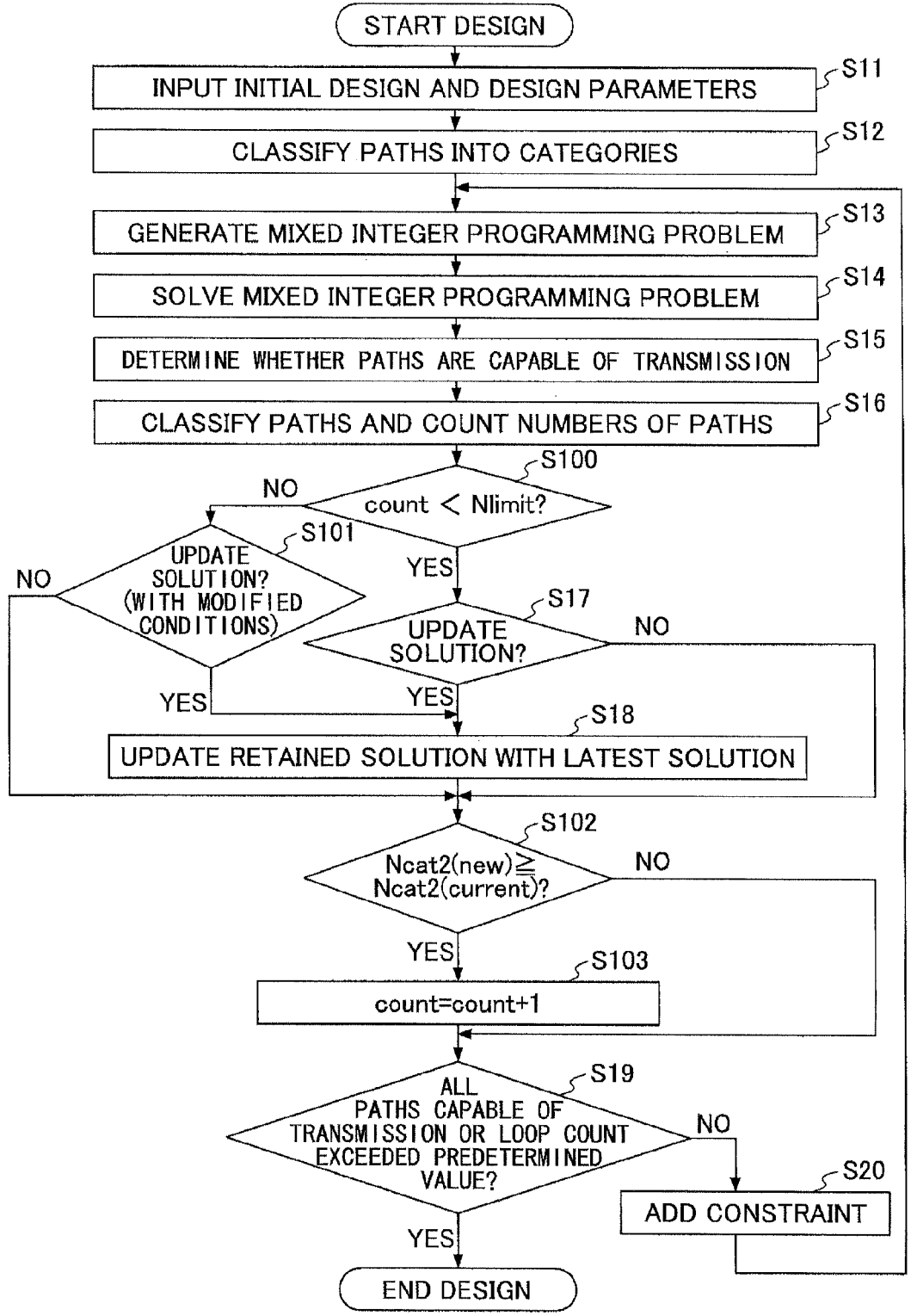
FIG. 20 is a flowchart illustrating a variation of the dispersion compensation design process of FIG. 9.

FIG. 20 is a flowchart illustrating a variation of the dispersion compensation design process of FIG. 9. In the dispersion compensation design process of FIG. 20, two types of update determining steps are provided. One of them uses modified (or less strict) conditions to determine whether to update the retained solution. If the number of second category paths is not reduced after the loop is repeated for a predetermined number of times, the update determining process is performed with the modified conditions.

In FIG. 20, the same reference numbers (step numbers) as those used in FIG. 9 are assigned to the corresponding steps in FIG. 20. In step S11 of FIG. 20, an initial design and design parameters are input into the dispersion compensation design system. More specifically, the following information items are input into the dispersion compensation design system: information on nodes constituting an optical network, information on connections between the nodes, lengths (or distances) of optical fibers implementing optical transmission lines, information on start and end nodes, the amounts of dispersion, route information including start and end points of paths and lists of nodes along the paths, target values and tolerable ranges of cumulative dispersion at the end points of the paths, an initial design of the arrangement (placement or layout) of DCMs, and transmission capability information indicating whether the respective paths are capable of transmission in the initial design.

In step S12, the paths are classified based on the route information and the transmission capability information in the initial design. In step S13, a mixed integer programming problem for designing the arrangement of DCMs with minimum dispersion compensation errors of the paths is generated. The objective function and constraints of the mixed integer programming problem are represented by formulas (1) through (4) above. In step S14, the mixed integer programming problem is solved. In step S15, whether the respective paths are capable of transmission is determined. In step S16, the paths are classified into categories and the numbers of paths in the categories are counted. In this step, the paths are classified into the categories that are also used in step S12 based on the route information and the determination results of step S15.

In step S100, whether a value count is less than a predetermined value Nlimit is determined. The value count indicates the number of times solutions are obtained without resulting in a decrease in the number of second category paths. If the value count is less than the value Nlimit, the update determining process is performed in step 17 using strict (or normal) conditions. Meanwhile, if the value count is greater than or equal to the value Nlimit, the update determining process is perform in step S101 using modified (or less strict) conditions. For example, the update determining conditions in the third embodiment that are stricter than the update determining conditions in the second embodiment may be used for step S17 and the update determining conditions in the second embodiment may be used for step S101.

If it is determined to update the retained solution in step S17 or S101, the retained solution is updated with the newly-obtained solution in step S18. In step S102, the number of second category paths Ncat2(new) in the newly-obtained solution is compared with the number of second category paths Ncat2(current) in the retained solution. If Ncat2(new) is greater than or equal to Ncat2(current), the value count is incremented by one in step S103.

In step S19, whether all the paths are capable of transmission and whether a loop count (i.e., the number of times the arrangement of DCMs is generated) has exceeded a predetermined value are determined. If one or more of the paths is incapable of transmission and the loop count is less than or equal to the predetermined value, a constraint that prevents use of the combinations of the amounts of dispersion compensation currently applied to the incapable paths is added.

<Compensation Amount Determining Method Other than Mixed Integer Programming>

Figure 21:
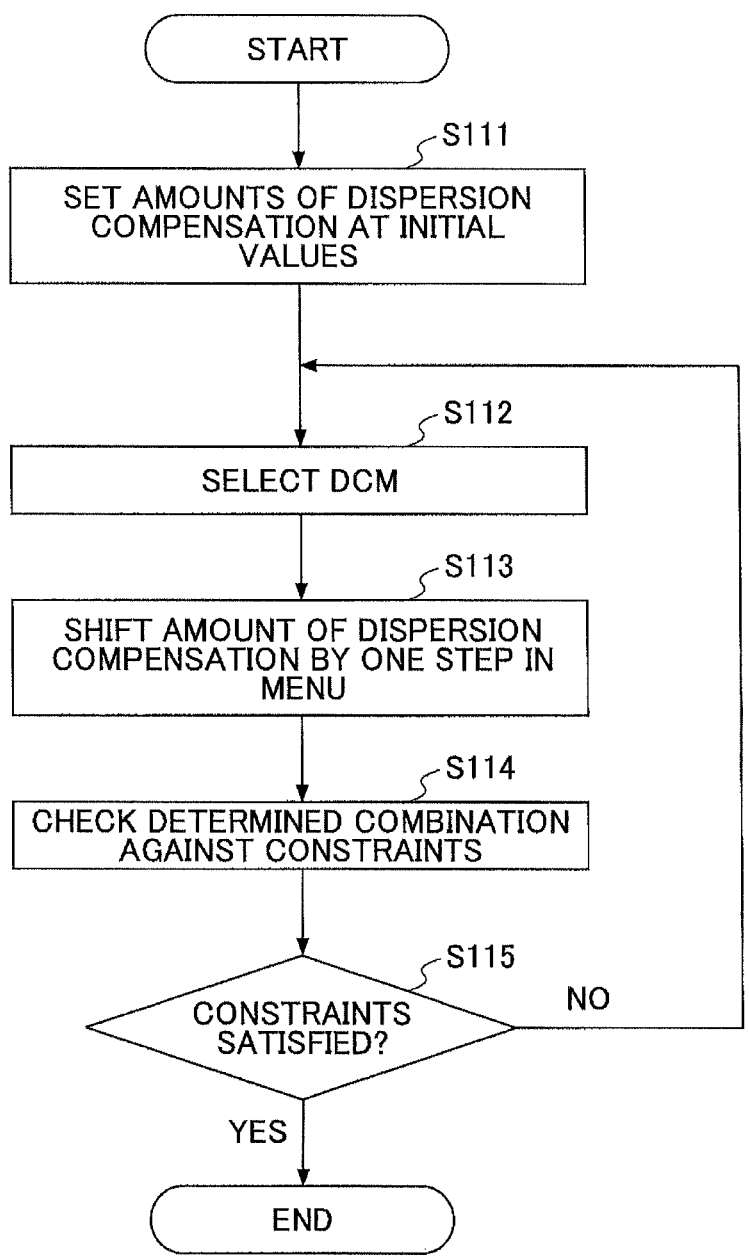
FIG. 21 is a flowchart illustrating an exemplary process of determining the amounts of compensation of dispersion compensation modules according to a combination search method.

In the above embodiments, the amounts of compensation of DCMs are determined based on mixed integer programming. Alternatively, methods other than mixed integer programming may be used to determine the amounts of compensation of DCMs. For example, a combination search method may be used for this purpose. FIG. 21 is a flowchart illustrating an exemplary process of determining the amounts of compensation of dispersion compensation modules according to a combination search method.

In step S111 of FIG. 21, the amounts of dispersion compensation are set at initial values. For example, the amounts of dispersion compensation that are closest to the amounts of dispersion of the respective spans may be used as the initial values. When an initial design is input, the amounts of dispersion compensation in the initial design may be used as the initial values. Further, the initial values may be determined based on the most-recently obtained solution or the retained solution.

In step S112, at least one DCM whose amount of dispersion compensation is to be changed is selected. In step S113, the amount of dispersion compensation of the selected DCM is shifted, for example, by one step of the compensation amount menu. For example, in step S112, a DCM where the difference between the amount of dispersion of the corresponding span and the amount of dispersion compensation of the DCM is largest may be selected. In another method, a path that has become incapable of transmission is identified and whether the amount of cumulative dispersion of the path is greater than an upper limit of the amount of dispersion is determined. If the amount of cumulative dispersion is greater than the upper limit, a span whose amount of dispersion is greater than the amount of dispersion compensation is identified and the amount of dispersion compensation for the span is increased by one step of the compensation amount menu. In still another method, a path that has become incapable of transmission is identified and whether the amount of cumulative dispersion of the path is less than a lower limit of the amount of dispersion is determined. If the amount of cumulative dispersion is less than the lower limit, a span whose amount of dispersion is less than the amount of dispersion compensation is identified and the amount of dispersion compensation for the span is decreased by one step of the compensation amount menu.

In step S112, one or more DCMs may be selected to change their amounts of dispersion compensation. If the amount of cumulative dispersion greatly exceeds the tolerable range, the amount of dispersion compensation may be changed by two steps of the compensation amount menu. Also, it is possible to change the amount of dispersion compensation of the entire path by two or more steps by changing the amounts of dispersion compensation of two or more DCMs by one step.

After a combination of the amounts of dispersion compensation is determined, the combination is checked against constraints in step S114. The constraints indicate combinations of the amounts of dispersion compensation that are previously obtained in solutions but are removed from the solutions as inappropriate. In step S114, the determined combination is compared with the constraints. If the determined combination matches none of the constraints, the process is completed. Meanwhile, if the determined combination matches one of the constraints, the process returns to step S112 and another combination of the amounts of dispersion compensation is generated.

The combination may be checked against formulas representing constraints added when the loop is repeated using the variable s[t] in formulas (3) and (4) which indicates whether the compensation amount menu item t is selected. When mixed integer programming is not used, constraints may be represented in any other manner, for example, by bitmaps.

For example, when there are three spans s1, s2, and s3 and three compensation amount menu items 1, 2, and 3 are provided, a bit string of 9 bits may be generated. The bit string may be defined such that the first bit from the left becomes 1 when the menu item 1 (100 ps/nm) is selected for the span s1, the second bit becomes 1 when the menu item 2 (200 ps/nm) is selected for the span s1, the third bit becomes 1 when the menu item 3 (300 ps/nm) is selected for the span s1, the fourth bit becomes 1 when the menu item 1 is selected for the span s2, the fifth bit becomes 1 when the menu item 2 is selected for the span s2, and so on.

Assuming that the menu item 2 is selected for the span s1, the menu item 3 is selected for the span s2, and the menu item 1 is selected for the span s3, the bit string becomes "010 001 100". Taking the first three bits for example, the first bit is 0, the second bit is 1, and the third bit is 0 because the menu item 2 is selected for the span s1. To prevent use of this combination of menu items, bitmap values "010 001 100" is stored, for example, in the memory 15 as a constraint. In this case, an obtained combination of the amounts of dispersion compensation is converted into a bitmap according to the above described rule, and the bitmap values of the obtained combination are exclusive-ORed with the bitmap values of the stored constraint. If the obtained combination of the amounts of dispersion compensation matches the combination of the amounts of dispersion compensation stored as the constraint, all bits become 0. Thus, the bitmap values of the obtained combination of the amounts of dispersion compensation are exclusive-ORed with the bitmap values of each of the constraints stored in the memory 15. If all the bits become 0 at least in one of the results, it is determined that the constraints are not satisfied in step S115 and the process returns to step S112. Meanwhile, if not all of the bits become 0 in all of the results, it is determined that the constraints are satisfied in step S115 and the process is completed.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A dispersion compensation design system, comprising:
a memory; and
at least one processor connected with the memory, configured to:
set a changed value for an amount of dispersion compensation for at least one of spans connecting nodes constituting an optical network;
determine whether respective paths in the optical network are capable of transmission on an assumption that the amount of dispersion compensation is updated with the changed value, and classify one or more of the paths as second category paths based on the determination results, wherein a path is classified as the second category path when the path itself is incapable of transmission but a longer path that includes the path and is capable of transmission exists, and capability of transmission is determined based on whether amounts of cumulative dispersion of the respective paths are within a range;
compare a retained previous classification result with a latest classification result, and update the amount of dispersion compensation for the at least one of the spans with the changed value and retain the latest classification result when a number of the second category paths in the latest classification result is less than a number of the second category paths in the retained previous classification result; and
prevent use of combinations of amounts of dispersion compensation applied to the spans in the second category paths in the latest classification result, and repeat setting of the changed value, the classification of the paths, and updating of the amount of dispersion compensation when not all of the paths in the optical network are capable of transmission,
wherein one or more of the paths are classified as first category paths and one or more of the paths are classified as the second category paths, wherein a path is classified as the first category path when the path itself is capable of transmission and all shorter paths included in the path are capable of transmission,
the amount of dispersion compensation is updated for the at least one of the spans with the changed value and retain the latest classification result when all the first category paths in a retained initial classification result are still capable of transmission in the latest classification result, and
the number of the second category paths in the latest classification result is less than the number of the second category paths in the retained previous classification result.

2. The dispersion compensation design system as claimed in claim 1, wherein
one or more of the paths are classified as first category paths and one or more of the paths are classified as the second category paths, wherein a path is classified as the first category path when the path itself is capable of transmission and all shorter paths included in the path are capable of transmission,
wherein the amount of dispersion compensation is updated for the at least one of the spans with the changed value and the latest classification result is retained when:
all the first category paths in a retained initial classification result are still capable of transmission in the latest classification result, a number of the paths capable of transmission in the latest classification result is greater than or equal to a number of the paths capable of transmission in the retained initial classification result, and
the number of the second category paths in the latest classification result is less than the number of the second category paths in the retained previous classification result, or the number of the second category paths in the latest classification result is equal to the number of the second category paths in the retained previous classification result and the number of the paths capable of transmission in the latest classification result is greater than the number of the paths capable of transmission in the retained previous classification result.

3. The dispersion compensation design system as claimed in claim 1,
wherein one or more of the paths are classified as first category paths and one or more of the paths are classified as the second category paths, wherein a path is classified as the first category path when the path itself is capable of transmission and all shorter paths included in the path are capable of transmission,
wherein the amount of dispersion compensation is updated for the at least one of the spans with the changed value and retain the latest classification result when all the first category paths in a retained initial classification result are still capable of transmission in the latest classification result, a number of the paths capable of transmission in the latest classification result is greater than a number of the paths capable of transmission in the retained previous classification result, and the number of the second category paths in the latest classification result is less than or equal to the number of the second category paths in the retained initial classification result, or
when all the first category paths in the retained initial classification result are still capable of transmission in the latest classification result, the number of the paths capable of transmission in the latest classification result is equal to the number of the paths capable of transmission in the retained previous classification result, and the number of the second category paths in the latest classification result is less than the number of the second category paths in the retained previous classification result.

4. The dispersion compensation design system as claimed in claim 1,
wherein one or more of the paths are classified as first category paths and one or more of the paths are classified as the second category paths, wherein a path is classified as the first category path when the path itself is capable of transmission and all shorter paths included in the path are capable of transmission,
wherein the amount of dispersion compensation is updated for the at least one of the spans with the changed value and retain the latest classification result when all the first category paths in a retained initial classification result are still capable of transmission in the latest classification result, and the number of the second category paths in the latest classification result is less than the number of the second category paths in the retained previous classification result, or
when all the first category paths in the retained initial classification result are still capable of transmission in the latest classification result, the number of the second category paths in the latest classification result is equal to the number of the second category paths in the retained previous classification result, and a total number of hops of the second category paths in the latest classification result is greater than a total number of hops of the second category paths in the retained previous classification result.

5. The dispersion compensation design system as claimed in claim 1,
wherein one or more of the paths are classified as first category paths and one or more of the paths are classified as the second category paths, wherein a path is classified as the first category path when the path itself is capable of transmission and all shorter paths included in the path are capable of transmission,
wherein the amount of dispersion compensation is updated for the at least one of the spans with the changed value and retain the latest classification result when all the first category paths in a retained initial classification result are still capable of transmission in the latest classification result, and the number of the second category paths in the latest classification result is less than the number of the second category paths in the retained previous classification result; or
when all the first category paths in the retained initial classification result are still capable of transmission in the latest classification result, the number of the second category paths in the latest classification result is equal to the number of the second category paths in the retained previous classification result, and a number of the second category paths in the latest classification result whose path lengths are shorter than a reference value is less than a number of the second category paths in the retained previous classification result whose path lengths are shorter than the reference value, the reference value being a largest path length of the first category paths in the retained initial classification result.

6. The dispersion compensation design system as claimed in claim 1, wherein one or more of the paths are classified as first category paths and one or more of the paths are classified as the second category paths, wherein a path is classified as the first category path when the path itself is capable of transmission and all shorter paths included in the path are capable of transmission;
wherein the amount of dispersion compensation is updated for the at least one of spans with the changed value and retain the latest classification result when all the first category paths in a retained initial classification result are still capable of transmission in the latest classification result, and the number of the second category paths in the latest classification result is less than the number of the second category paths in the retained previous classification result; or
when all the first category paths in the retained initial classification result are still capable of transmission in the latest classification result, the number of the second category paths in the latest classification result is equal to the number of the second category paths in the retained previous classification result, and a number of the second category paths in the latest classification result whose path lengths are shorter than a reference value is less than a number of the second category paths in the retained previous classification result whose path lengths are shorter than the reference value
wherein the reference value is an average of path lengths of selected first category paths of the first category paths in the retained initial classification result, the selected first category paths being included in longer paths that are longer than the selected first category paths by one hop and incapable of transmission.

7. The dispersion compensation design system as claimed in claim 1,
wherein one or more of the paths are classified as first category paths and one or more of the paths are classified as the second category paths, wherein a path is classified as the first category path when the path itself is capable of transmission and all shorter paths included in the path are capable of transmission;
wherein the amount of dispersion compensation for the at least one of spans with the changed value and retain the latest classification result when all the first category paths in a retained initial classification result are still capable of transmission in the latest classification result, and the number of the second category paths in the latest classification result is less than the number of the second category paths in the retained previous classification result; or when all the first category paths in the retained initial classification result are still capable of transmission in the latest classification result, the number of the second category paths in the latest classification result is equal to the number of the second category paths in the retained previous classification result, and a number of the second category paths in the latest classification result whose path lengths are shorter than a reference value is less than a number of the second category paths in the retained previous classification result whose path lengths are shorter than the reference value, and wherein the reference value is an average of path lengths of selected first category paths of the first category paths in the retained previous classification result, the selected first category paths being included in longer paths that are longer than the selected first category paths by one hop and incapable of transmission.

8. The dispersion compensation design system as claimed in claim 1, wherein one or more of the paths are classified as first category paths and one or more of the paths are classified as the second category paths, wherein a path is classified as the first category path when the path itself is capable of transmission and all shorter paths included in the path are capable of transmission, wherein the amount of dispersion compensation is updated for the at least one of the spans with the changed value and retain the latest classification result when all the first category paths in a retained initial classification result are still capable of transmission in the latest classification result, and the number of the second category paths in the latest classification result is less than the number of the second category paths in the retained previous classification result or when all the first category paths in the retained initial classification result are still capable of transmission in the latest classification result, the number of the second category paths in the latest classification result is equal to the number of the second category paths in the retained previous classification result, and an average path length of the second category paths in the latest classification result is greater than an average path length of the second category paths in the retained previous classification result.

9. The dispersion compensation design system as claimed in claim 1, wherein one or more of the paths are classified as first category paths and one or more of the paths are classified as the second category paths, wherein a path is classified as the first category path when the path itself is capable of transmission and all shorter paths included in the path are capable of transmission, wherein the amount of dispersion compensation is updated for the at least one of the spans with the changed value and retain the latest classification result when all the first category paths in a retained initial classification result are still capable of transmission in the latest classification result, and the number of the second category paths in the latest classification result is less than the number of the second category paths in the retained previous classification result, or when all the first category paths in the retained initial classification result are still capable of transmission in the latest classification result, the number of the second category paths in the latest classification result is equal to the number of the second category paths in the retained previous classification result, and a smallest path length of the second category paths in the latest classification result is greater than a smallest path length of the second category paths in the retained previous classification result.

10. The dispersion compensation design system as claimed in claim 1, wherein one or more of the paths are classified as first category paths and one or more of the paths are classified as second category paths, a path being classified as the first category path when the path itself is capable of transmission and all shorter paths included in the path are capable of transmission, wherein when a number of times at which the number of the second category paths in the latest classification result has become greater than or equal to the number of the second category paths in the retained previous classification result, is less than a predetermined value, the amount of dispersion compensation is updated for the at least one of the spans with the changed value and the latest classification result is retained, in a case where:

all the first category paths in a retained initial classification result are still capable of transmission in the latest classification result, a number of the paths capable of transmission in the latest classification result is greater than or equal to a number of the paths capable of transmission in the retained initial classification result, and the number of the second category paths in the latest classification result is less than the number of second category paths in the retained previous classification result, or the number of the second category paths in the latest classification result is equal to the number of the second category paths in the retained previous classification result and the number of paths capable of transmission in the latest classification result is greater than the number of paths capable of transmission in the retained previous classification result, wherein when the number of times is greater than or equal to the predetermined value, the amount of dispersion compensation is updated for the at least one of the spans with the changed value and retains the latest classification result in a case where all the first category paths in a retained initial classification result are still capable of transmission in the latest classification result and the number of the second category paths in the latest classification result is less than the number of the second category paths in the retained previous classification result.

11. The dispersion compensation design system as claimed in claim 1, wherein the changed value is set for the amount of dispersion compensation for the at least one of the spans by solving a mixed integer programming problem including an object function for minimizing differences between cumulative dispersion values and cumulative dispersion target values at end nodes of the respective paths.

12. The dispersion compensation design system as claimed in claim 10, wherein the first condition is satisfied
when all the first category paths in a retained initial classification result are still capable of transmission in the latest classification result, and a number of the paths capable of transmission in the latest classification result is greater than or equal to a number of the paths capable of transmission in the retained initial classification result, and when the number of the second category paths in the latest classification result is less than the number of the second category paths in the retained previous classification result, or the number of the second category paths in the latest classification result is equal to the number of the second category paths in the retained previous classification result and the number of the paths capable of transmission in the latest classification result is greater than the number of the paths capable of transmission in the retained previous classification result, and wherein the second condition is satisfied when all the first category paths in the retained initial classification result are still capable of transmission in the latest classification result, and the number of the second category paths in the latest classification result is less than the number of the second category paths in the retained previous classification result.

13. A dispersion compensation design method, comprising:

setting a changed value for an amount of dispersion compensation for at least one of spans connecting nodes constituting an optical network;

determining, using a processor, whether respective paths in the optical network are capable of transmission on an assumption that the amount of dispersion compensation is updated with the changed value;

classifying one or more of the paths as second category paths based on the determination results, wherein a path is classified as the second category path when the path itself is incapable of transmission but there is a longer path that includes the path and is capable of transmission;

comparing a retained previous classification result with a latest classification result of the classifying;

updating the amount of dispersion compensation for the at least one of the spans with the changed value and retaining the latest classification result when a number of the second category paths in the latest classification result is less than a number of the second category paths in the retained previous classification result; and preventing use of combinations of amounts of dispersion compensation applied to the spans in the second category paths in the latest classification result and repeating the setting, the determining, the classifying, the comparing, and the updating, when not all of the paths in the optical network are capable of transmission, wherein capability of transmission is determined based on whether amounts of cumulative dispersion of the respective paths are within a range, wherein in the classifying, one or more of the paths are classified as first category paths and one or more of the paths are classified as the second category paths, wherein a path is classified as the first category path when the path itself is capable of transmission and all shorter paths included in the path are capable of transmission, and wherein in the updating, the amount of dispersion compensation for the at least one of spans is updated with the changed value and the latest classification result is retained when all the first category paths in a retained initial classification result are still capable of transmission in the latest classification result, and the number of the second category paths in the latest classification result is less than the number of the second category paths in the retained previous classification result.

14. The dispersion compensation design method as claimed in claim 13, wherein in the classifying, one or more of the paths are classified as first category paths and one or more of the paths are classified as the second category paths, wherein a path is classified as the first category path when the path itself is capable of transmission and all shorter paths included in the path are capable of transmission, wherein in the updating, the amount of dispersion compensation for the at least one of the spans is updated with the changed value and the latest classification result is retained when:

all the first category paths in a retained initial classification result are still capable of transmission in the latest classification result, a number of the paths capable of transmission in the latest classification result is greater than or equal to a number of the paths capable of transmission in the retained initial classification result and the number of the second category paths in the latest classification result is less than the number of the second category paths in the retained previous classification result, or the number of the second category paths in the latest classification result is equal to the number of the second category paths in the retained previous classification result and the number of the paths capable of transmission in the latest classification result is greater than the number of the paths capable of transmission in the retained previous classification result.

15. The dispersion compensation design method as claimed in claim 13, wherein one or more of the paths are classified as first category paths and one or more of the paths are classified as second category paths, a path being classified as the first category path when the path itself is capable of transmission and all shorter paths included in the path are capable of transmission, and wherein when a number of times at which the number of the second category paths in the latest classification result has become greater than or equal to the number of the second category paths in the retained previous classification result is less than a predetermined value, the updating updates the amount of dispersion compensation for the at least one of the spans with the changed value and retains the latest classification result, in a case where:

all the first category paths in a retained initial classification result are still capable of transmission in the latest classification result, a number of the paths capable of transmission in the latest classification result is greater than or equal to a number of the paths capable of transmission in the retained initial classification result, and the number of the second category paths in the latest classification result is less than the number of second category paths in the retained previous classification result, or the number of the second category paths in the latest classification result is equal to the number of the second category paths in the retained previous classification result and the number of paths capable of transmission in the latest classification result is greater than the number of paths capable of transmission in the retained previous classification result, wherein when the number of times is greater than or equal to the predetermined value, the updating updates the amount of dispersion compensation for the at least one of the spans with the changed value and retain the latest classification result in a case where all the first category paths in a retained initial classification result are still capable of transmission in the latest classification result and the number of the second category paths in the latest classification result is less than the number of the second category paths in the retained previous classification result.

* * * * *